United States Patent
Dubey et al.

(10) Patent No.: US 10,445,671 B2
(45) Date of Patent: Oct. 15, 2019

(54) CROWDSOURCING A TASK

(71) Applicant: Accenture Global Services Limited, Dublin (IE)

(72) Inventors: Alpana Dubey, Bangalore (IN); Gurdeep Virdi, Bangalore (IN); Anurag Dwarakanath, Bangalore (IN); Alex Kass, Palo Alto, CA (US); Sakshi Taneja, New Delhi (IN); Suma Mani Kuriakose, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 598 days.

(21) Appl. No.: 14/919,139

(22) Filed: Oct. 21, 2015

(65) Prior Publication Data

US 2017/0061357 A1 Mar. 2, 2017

(30) Foreign Application Priority Data

Aug. 27, 2015 (IN) .......................... 4516/CHE/2015

(51) Int. Cl.
*G06Q 10/06* (2012.01)
*G06Q 40/00* (2012.01)
(Continued)

(52) U.S. Cl.
CPC ... *G06Q 10/063112* (2013.01); *G06Q 10/067* (2013.01); *G06Q 10/105* (2013.01); *G06Q 40/12* (2013.12); *G06Q 50/01* (2013.01)

(58) Field of Classification Search
CPC .............................................. G06Q 10/063112
See application file for complete search history.

(56) References Cited

U.S. PATENT DOCUMENTS

2002/0194045 A1 12/2002 Shay et al.
2006/0229902 A1* 10/2006 McGovern ............ G06Q 10/06
705/321

(Continued)

FOREIGN PATENT DOCUMENTS

WO WO2014/111948 7/2014

OTHER PUBLICATIONS

Wikipedia, "Crowdsourcing", http://web.archive.org/web/20071016231656/https://en.wikipedia.org/wiki/Crowdsourcing, Oct. 11, 2007, 3 pages.

(Continued)

*Primary Examiner* — Alan S Miller
*Assistant Examiner* — Arif Ullah
(74) *Attorney, Agent, or Firm* — Harrity & Harrity, LLP

(57) ABSTRACT

A system may receive task information identifying tasks to be performed by workers of one or more crowds. The system may obtain worker information describing the workers. The system may determine task completion probabilities based on the task information and the worker information. A task completion probability may identify a likelihood that a particular crowd will complete a particular task. The system may determine crowd recommendation information based on the task completion probabilities, the task information, and/or the worker information. The crowd recommendation information may identify recommended crowds to which a task is recommended to be provided. The system may output the crowd recommendation information and/or the worker information to permit selection of the crowds to perform the task.

20 Claims, 17 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 2009/0204470 A1* | 8/2009 | Weyl | G06Q 10/06311 705/7.13 |
| 2013/0317871 A1 | 11/2013 | Kulkarni et al. | |
| 2014/0095242 A1 | 4/2014 | Helbok et al. | |
| 2014/0122188 A1 | 5/2014 | Van Pelt et al. | |
| 2014/0214467 A1 | 7/2014 | Asur et al. | |
| 2014/0229413 A1 | 8/2014 | Dasgupta et al. | |
| 2014/0278657 A1* | 9/2014 | Horvitz | G06Q 10/06311 705/7.17 |
| 2014/0358605 A1 | 12/2014 | Balamurugan et al. | |
| 2016/0140477 A1* | 5/2016 | Karanam | G06Q 10/06312 705/7.14 |

OTHER PUBLICATIONS

Howe, J, The Ride of Crowdsourcing, Wired Magazine, Jun. 1, 2006, 10 pages.

Howe, J, "Crowdsourcing: Why the Power of the Crowd is Driving the Future of Business", The International Achievement Institute, 2008, 9 pages.

Goel G., et al., "Matching Workers Expertise With Tasks: Incentives in Heterogeneous Crowdsourcing Markets," NIPS Workshop on Crowdsourcing, Dec. 2013, 15 pages. [online], [retrieved on May 29, 2019] Retrieved from the Internet [URL:https://pdfs.semanticscholar.org/8d7e/1f05170561dffbc6b3a7e7aee9611919675b.pdf].

Yuen M., et al., "Task Matching in Crowdsourcing," 2011 International Conference on Internet of Things and 4th International Conference on Cyber, Physical and Social Computing, Oct. 2011, pp. 409-412. [online], [retrieved on May 29, 2019] Retrieved from the Internet:[URL: https://ieeexplore.ieee.org/abstract/document/6142254].

\* cited by examiner

Normalize duration values (Min = 20; Max = 100) ~740

$$D_{norm,i} = min + \frac{(D_{max} - D_i)}{(D_{max} - D_{min})} (max - min)$$ ~742

$$D_{norm,T1} = 20 + \frac{4-3}{4-2} \times (100 - 20) = 70$$ ~744

$D_{norm,T2} = 20$, $D_{norm,T3} = 100$, $D_{norm,T4} = 70$, $D_{norm,T5} = 70$ ~746

Divide tasks into duration buckets ~748
Bucket D=2: $T_3$   Bucket D=3: $T_1$, $T_4$, $T_5$   Bucket D=4: $T_2$ ~750

Normalize costs in buckets with multiple tasks (min = 20, max = 100) ~752

$$C_{norm,i} = min + \frac{(C_i/D_i - C_{min}/D_i)}{(C_{max}/D_i - C_{min}/D_i)} (max - min)$$ ~754

$$C_{norm,T1} = 20 + \frac{(1000/3 - 700/3)}{(1000/3 - 700/3)} (100 - 20) = 100$$ ~756

$C_{norm,T2} = 85.7$, $C_{norm,T3} = 43.5$, $C_{norm,T4} = 20$, $C_{norm,T5} = 70$ ~758

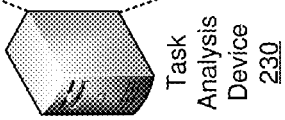

Task Analysis Device 230

CROWDSOURCING A TASK

RELATED APPLICATION

This application claims priority under 35 U.S.C. § 119 to Indian Provisional Patent Application No. 4516/CHE/2015, filed on Aug. 27, 2015, the content of which is incorporated by reference herein in its entirety.

BACKGROUND

Crowdsourcing is a process of obtaining needed services, ideas, and/or content by soliciting contributions from a large group of workers (e.g., an online community of people), rather than from traditional employees or suppliers. Crowdsourcing can involve division of labor, competition, crowdfunding, and/or a general search to obtain the needed services, ideas, and/or content.

SUMMARY

In some possible implementations, a device may include one or more processors. The device may receive task information describing one or more tasks to be performed by one or more workers, of a plurality of workers associated with one or more crowds. The device may obtain worker information describing the plurality of workers and/or the one or more crowds. The device may determine one or more task completion probabilities based on the task information and the worker information. A task completion probability, of the one or more task completion probabilities, may identify a likelihood that a particular crowd, of the one or more crowds, will complete a particular task that is provided to the particular crowd. The device may determine crowd recommendation information based on the one or more task completion probabilities, the task information, and/or the worker information. The crowd recommendation information may identify one or more recommended crowds, of the one or more crowds, to which the one or more tasks are recommended to be provided. The device may provide the recommendation information and/or the worker information.

In some possible implementations, a non-transitory computer-readable medium may store one or more instructions. The one or more instructions, when executed by one or more processors of one or more devices, may cause the one or more processors to receive task information identifying a task to be performed by one or more workers, of a set of workers associated with one or more crowds. The one or more instructions, when executed by the one or more processors, may cause the one or more processors to obtain worker information associated with the set of workers. The one or more instructions, when executed by the one or more processors, may cause the one or more processors to determine a set of task completion probabilities based on the task information and the worker information. A task completion probability, of the set of task completion probabilities, may identify a likelihood that a particular crowd, of the one or more crowds, will complete the task. The one or more instructions, when executed by the one or more processors, may cause the one or more processors to determine crowd recommendation information based on the one or more task completion probabilities, the task information, and/or the worker information. The crowd recommendation information may identify recommended crowds, of the one or more crowds, to which the task is recommended to be provided. The one or more instructions, when executed by the one or more processors, may cause the one or more processors to provide the recommendation information and/or the worker information to permit selection of the one or more of the recommended crowds to perform the task.

In some possible implementations, a method may include receiving task information identifying a set of tasks to be performed by one or more workers, of a set of workers associated with a set of crowds. The method may include obtaining worker information describing the set of workers. The method may include determining a set of task completion probabilities based on the task information and the worker information. A task completion probability, of the set of task completion probabilities, may identify a likelihood that a particular crowd, of the set of crowds, will complete a particular task that has been provided to the particular crowd. The method may include determining crowd recommendation information based on the set of task completion probabilities, the task information, and/or the worker information. The recommendation information may identify recommended crowds, of the set of crowds, to which a task, of the set of tasks, is recommended to be provided. The method may include outputting the recommendation information and/or the worker information to permit selection of the one or more of the set of crowds to perform the task.

BRIEF DESCRIPTION OF THE DRAWINGS

FIGS. 7A-7J are diagrams of an example implementation relating to the example processes shown in FIGS. 4-6.

DETAILED DESCRIPTION

The following detailed description of example implementations refers to the accompanying drawings. The same reference numbers in different drawings may identify the same or similar elements.

An organization that requires a task to be performed may crowdsource the task by providing the task to a set of workers, of a crowd. One or more of the workers may perform the task, and may return information to the organization related to performing the task. However, some crowds may be unsuitable for performing a certain task, and an organization may have access to multiple crowds composed of workers that may be associated with different skills, availability, and reliability based on past performance. The organization may encounter difficulty in assigning tasks to the crowds based on such variations between the crowds/workers. Implementations described herein may enable a device to determine crowds that are more likely than other crowds to complete a given task. Implementations described herein may further enable the device to match a task to a set of workers from different crowds, in order to perform a task for which any particular crowd may be unsuitable. In this way, the device saves the organization time and money, conserves processor resources, and maximizes use of human resources by improving efficiency of the crowdsourcing process.

Figure 1A:
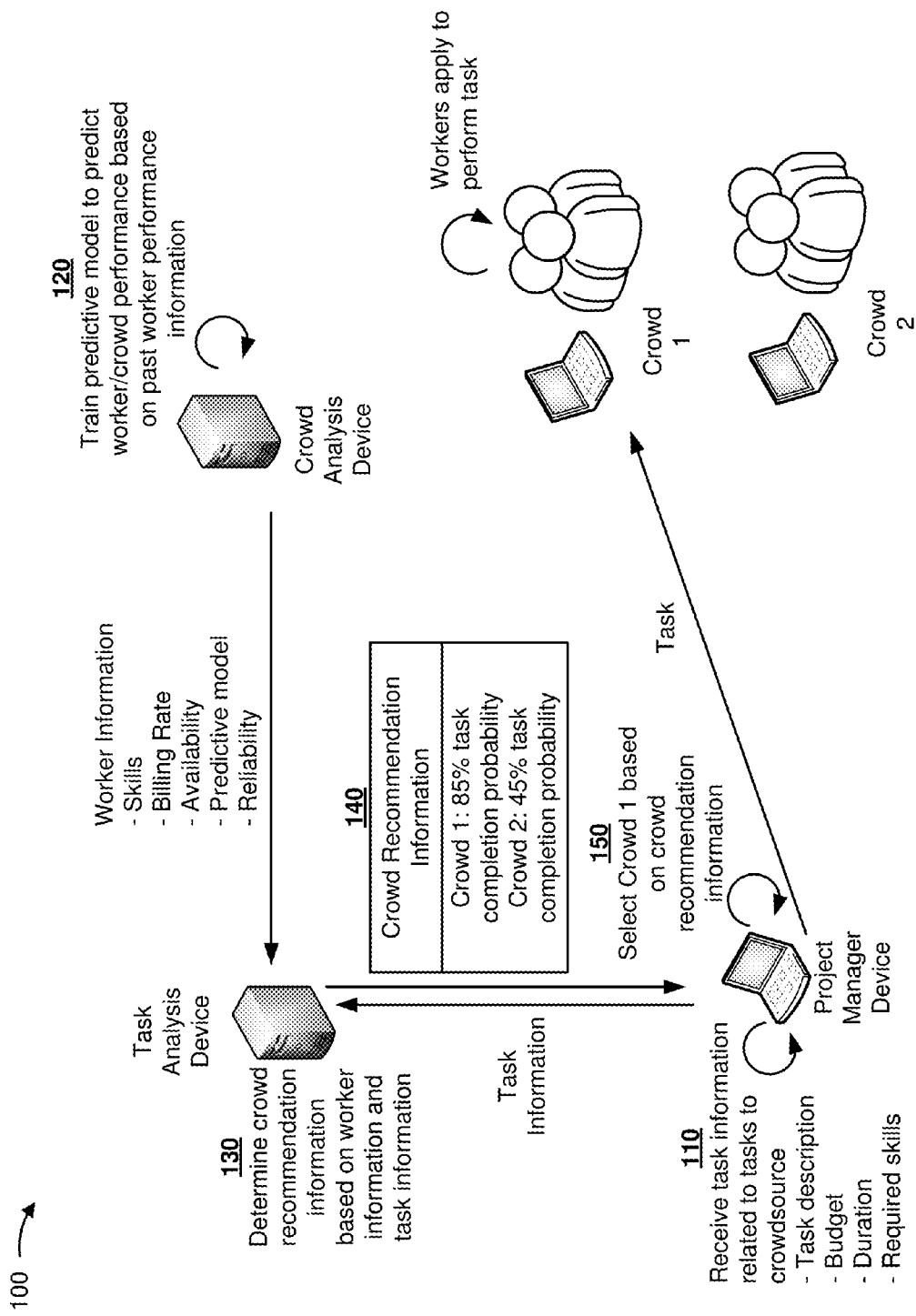
FIGS. 1A and 1B are diagrams of an overview of an example implementation described herein.
Figure 1B:
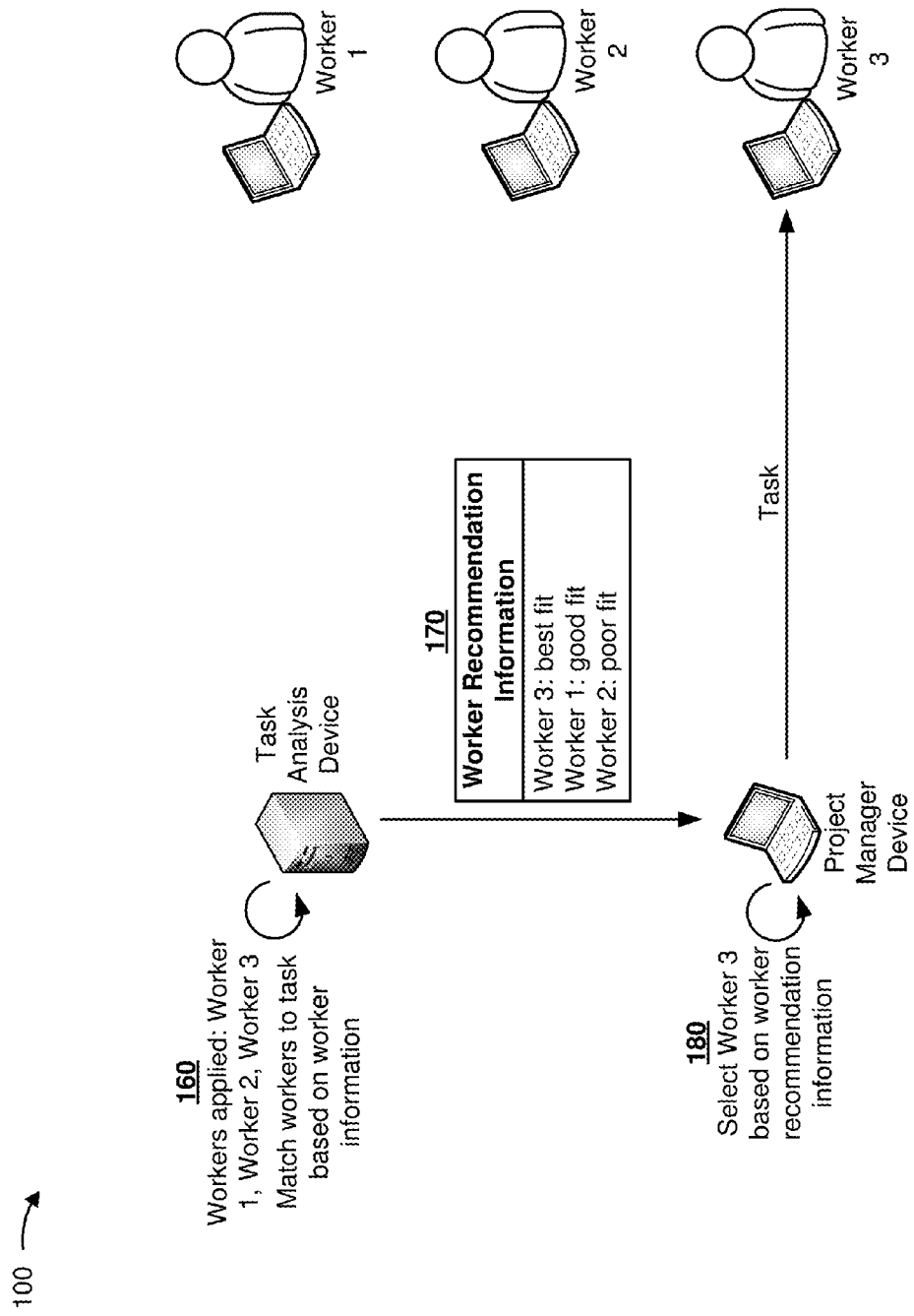

FIGS. 1A and 1B are diagrams of an overview of an example implementation 100 described herein. As shown in FIG. 1A, and by reference number 110, a project manager device may receive task information describing tasks to crowdsource. As further shown, the task information may include a task description, a budget associated with a task, a duration associated with a task, one or more skills associated with performing a task, or the like. The project manager device may receive the task information to permit the project manager device and/or another device to determine one or more workers and/or crowds to which to crowdsource the tasks. The workers/crowds may perform tasks received from the project manager device, and may be associated with past worker performance information describing performance of the workers/crowds with regard to performance of prior tasks.

As shown by reference number 120, a crowd analysis device may receive the past worker performance information, and may train a predictive model to predict performance, by the workers/crowds, on future tasks. As further shown, the crowd analysis device may train the predictive model based on past worker performance information. For example, as the workers/crowds perform tasks, the crowd analysis device may receive information related to performance on the tasks (e.g., whether the task was completed, a score associated with the quality of completed and/or incomplete tasks, etc.), and may train the model to predict performance, by the workers/crowds, on future tasks. As shown, the crowd analysis device may store and/or provide worker information identifying skills of workers, billing rates associated with workers, availability of workers, reliability of workers, crowdsourcing platforms associated with the workers, and/or the predictive model.

As shown, a task analysis device may receive the task information from the project manager device, and may receive the worker information from the crowd analysis device. In some implementations, the task analysis device may obtain worker information for particular workers and/or crowds based on the task information. For example, if the task requires particular skills, a confidentiality level, or the like, the task analysis device may obtain worker information relating to workers and/or crowds with the particular skills, the confidentiality level, or the like. As another example, the task analysis device may obtain information for workers associated with different crowds, different organizations, or the like, based on the task information. As shown by reference number 130, the task analysis device may determine crowd recommendation information based on the worker information and the task information.

As shown by reference number 140, the task analysis device may provide the crowd recommendation information to the project manager device. As further shown, the crowd recommendation information may include task completion probabilities, which may identify a predicted likelihood that a particular crowd, will perform an assigned task satisfying the task requirements. The task analysis device may determine the task completion probabilities based on the predictive model, the worker information, and the task information. For example, the predictive model may receive task information as input, and may provide a task completion probability, for a particular crowd, based on the task information. Here, Crowd 1 is associated with a task completion probability of 85%, and Crowd 2 is associated with a task completion probability of 45%. In some cases, the crowd recommendation information may recommend one or more crowds to perform the task (e.g., based on skills, budgets, billing rates, confidentiality levels, etc.). In some cases, the task analysis device may rank the crowds in order of preference based on the crowd recommendation information.

As shown by reference number 150, the project manager device selects Crowd 1 based on the crowd recommendation information, including the task completion probability, and provides the task to Crowd 1. As further shown, workers, from Crowd 1, apply to perform the task (e.g., based on a prize associated with performing the task, etc.). In some cases, the project manager device may provide the task to different organizations, different crowds, etc. which may improve efficiency of performance of the task and thus conserve processor resources.

As shown in FIG. 1B, and by reference number 160, the task analysis device may receive information identifying which workers, of Crowd 1, applied to perform the task. As further shown, the task analysis device may match the workers to the task based on the worker information. As shown by reference number 170, the task analysis device may provide worker recommendation information, which may identify and/or rank the workers matched to the task. As shown, Worker 3 is determined by the task analysis device to be a best fit for the task, Worker 1 is determined to be a good fit, and Worker 2 is determined to be a poor fit.

As shown by reference number 180, the project manager device may select Worker 3 based on the worker recommendation information. As further shown, the project manager device may provide the task to Worker 3. In this way, the project manager device may select workers from a variety of crowds to which to crowdsource tasks. By selecting the workers/crowds based on task completion probabilities and/or worker recommendation information identifying recommended workers, the project manager device may more efficiently crowdsource tasks, and may provide the tasks to workers that are well suited to the task and thus more likely to perform the task in a satisfactory manner.

Figure 2:
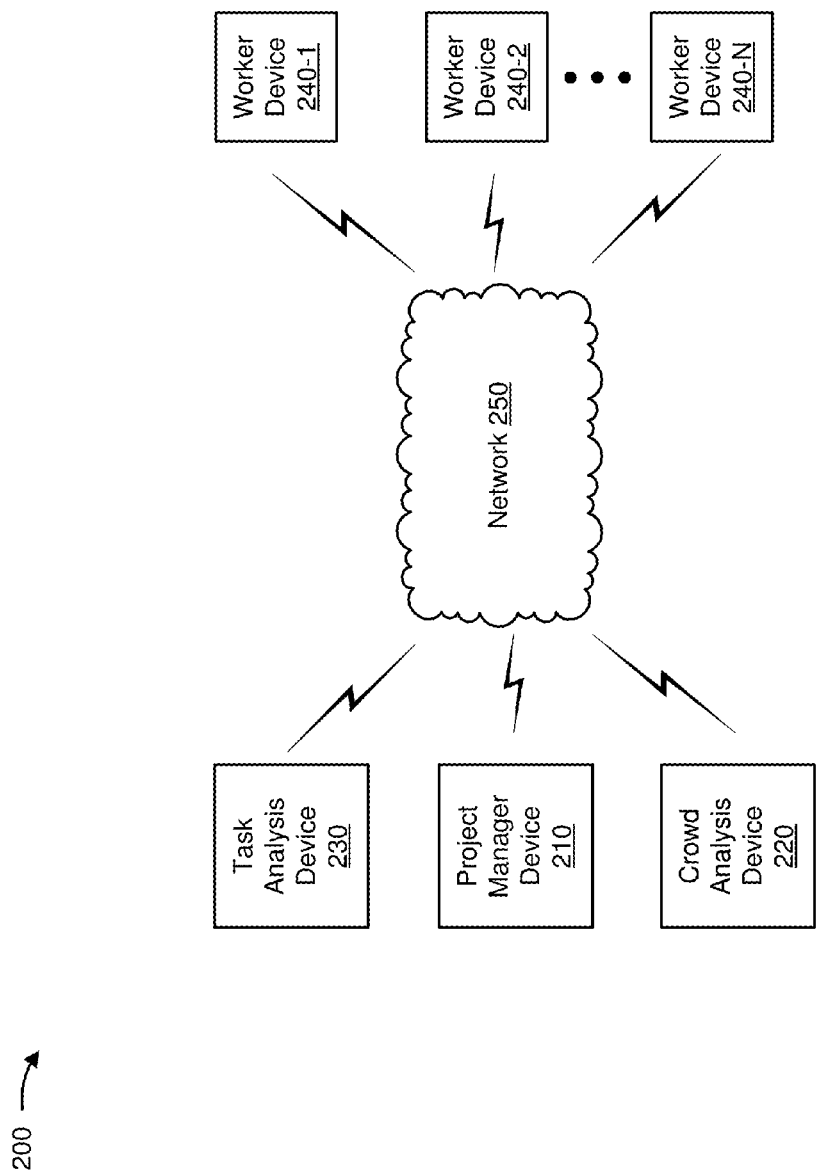
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a project manager device 210, a crowd analysis device 220, a task analysis device 230, one or more worker devices 240-1 through 240-N (hereinafter referred to individually as "worker device 240," and collectively as "worker devices 240"), and a network 250. Devices of environment 200 may interconnect via wired connections, wireless connections, or a combination of wired and wireless connections.

Project manager device 210 may include a device capable of providing, presenting, and/or displaying information. For example, project manager device 210 may include a mobile phone (e.g., a smart phone, a radiotelephone, etc.), a computing device (e.g., a desktop computer, a laptop computer, a tablet computer, a handheld computer, etc.), and/or a device of a similar type. In some implementations, project manager device 210 may include a communication interface that allows project manager device 210 to receive information from and/or transmit information to other devices of environment 200.

Crowd analysis device 220 may include a device capable of receiving, storing, generating, processing, and/or providing information. For example, crowd analysis device 220 may include a computing device (e.g., a desktop computer, a laptop computer, a tablet computer, a handheld computer, etc.), a server, a device in a cloud computing network, or a similar device. In some implementations, crowd analysis device 220 may include a communication interface that allows crowd analysis device 220 to receive information from and/or transmit information to project manager device 210, worker device 240, or another device.

Task analysis device 230 may include a device capable of receiving, storing, generating, processing, and/or providing information. For example, task analysis device 230 may include a computing device (e.g., a desktop computer, a laptop computer, a tablet computer, a handheld computer, etc.), a server, a device in a cloud computing network, or a similar device. In some implementations, task analysis device 230 may include a communication interface that allows task analysis device 230 to receive information from and/or transmit information to project manager device 210, worker device 240, or another device.

Worker device 240 may include a device capable of providing, presenting, and/or displaying information. For example, worker device 240 may include a mobile phone (e.g., a smart phone, a radiotelephone, etc.), a computing device (e.g., a desktop computer, a laptop computer, a tablet computer, a handheld computer, etc.), or the like. In some implementations, worker device 240 may include an interface (e.g., a user interface, a communication interface, etc.) that allows worker device 240 to receive information from and/or provide information to a user, to project manager device 210, to crowd analysis device 220, or to another device.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
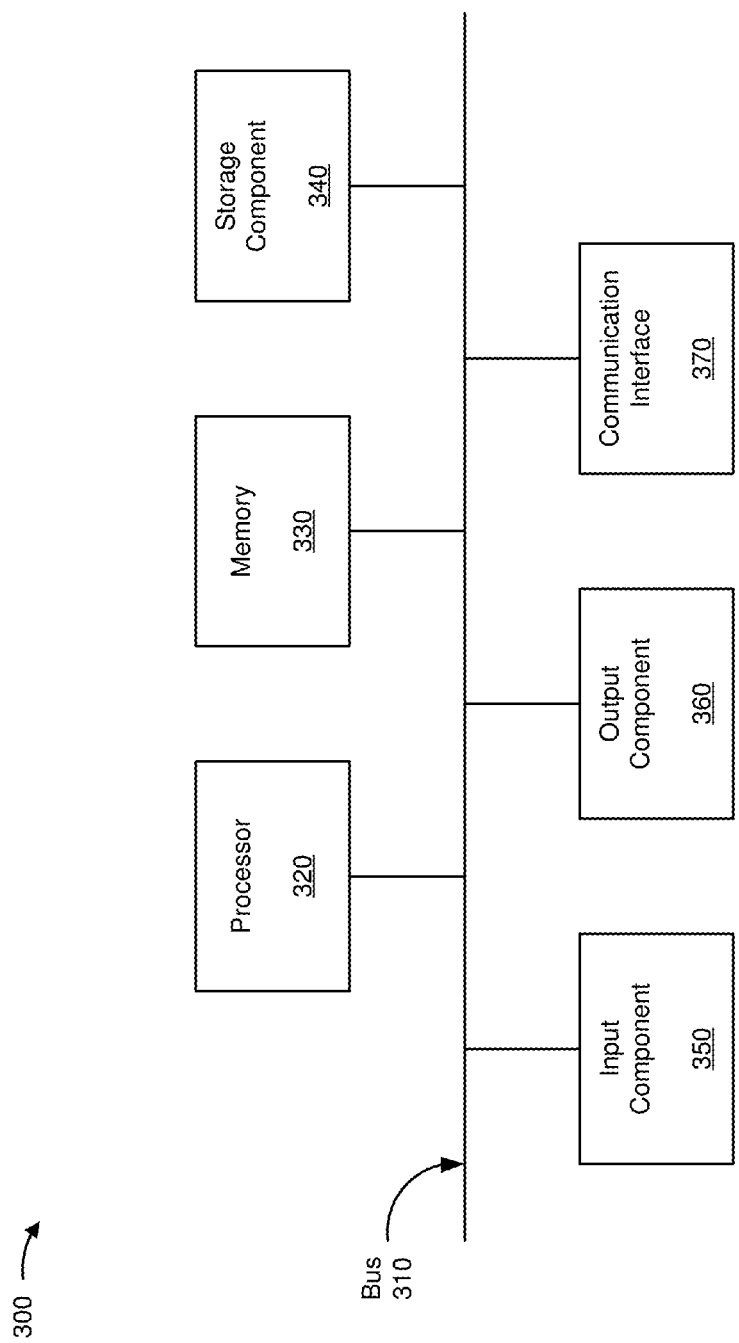
FIG. 3 is a diagram of example components of one or more devices of FIG. 2.

FIG. 3 is a diagram of example components of a device 300. Device 300 may correspond to project manager device 210, crowd analysis device 220, task analysis device 230, and/or worker device 240. In some implementations, project manager device 210, crowd analysis device 220, task analysis device 230, and/or worker device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
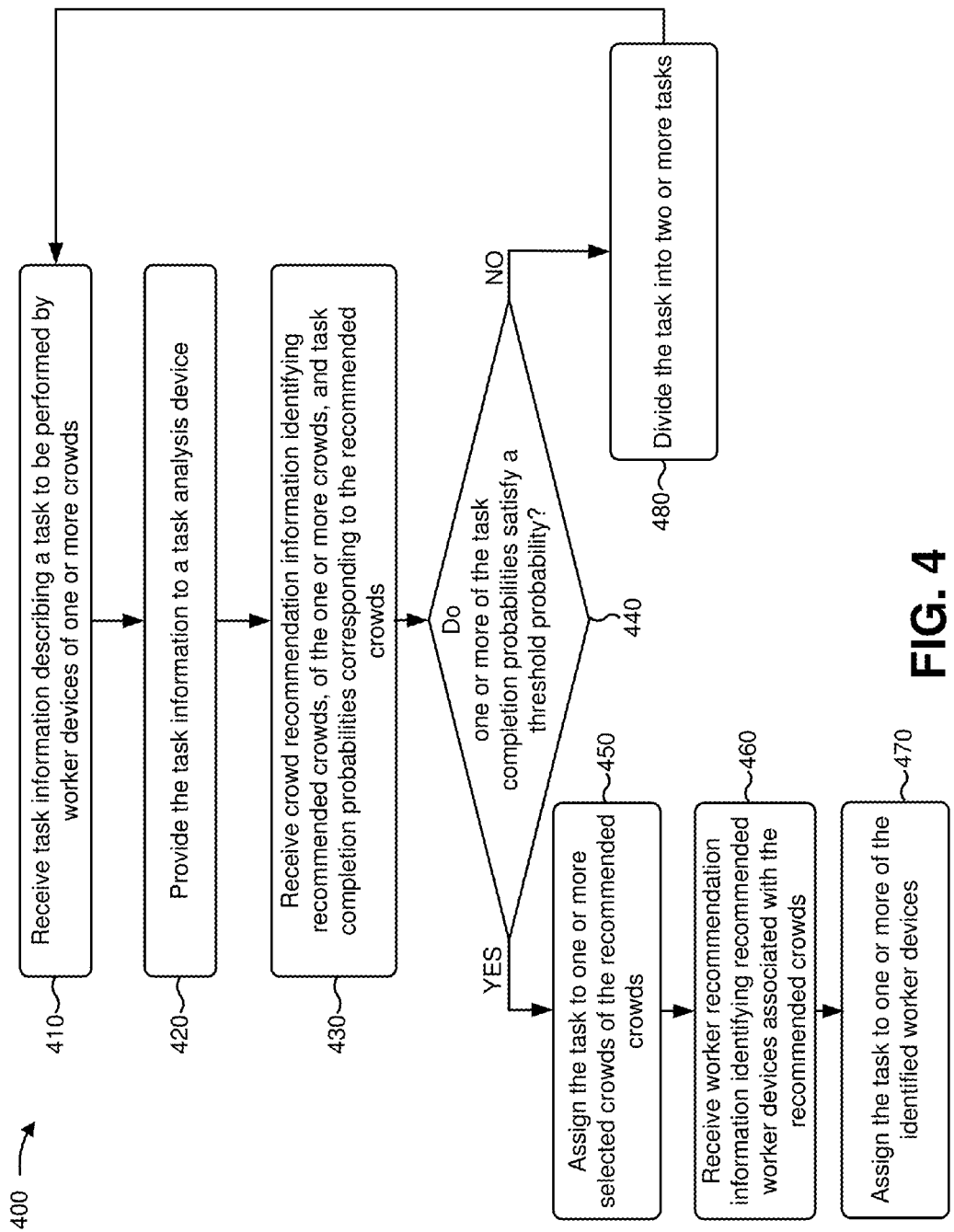
FIG. 4 is a flow chart of an example process for selecting crowds to which to provide a task.

FIG. 4 is a flow chart of an example process 400 for selecting crowds to which to provide a task. In some implementations, one or more process blocks of FIG. 4 may be performed by project manager device 210. In some implementations, one or more process blocks of FIG. 4 may be performed by another device or a group of devices separate from or including project manager device 210, such as crowd analysis device 220, task analysis device 230, and/or worker device 240.

As shown in FIG. 4, process 400 may include receiving task information describing a task to be performed by worker devices of one or more crowds (block 410). For example, project manager device 210 may receive task information. In some implementations, a user of project manager device 210 may input the task information (e.g., via a user interface of project manager device 210, by providing the task information on readable memory, by uploading the task information, by providing a link to the task information, etc.). Additionally, or alternatively, project manager device 210 may determine the task information. For example, project manager device 210 may receive information related to one or more tasks, and may generate the task information based on the information related to the one or more tasks. Project manager device 210 may receive the task information in order to determine one or more crowds to which to provide the one or more tasks, for workers of the one or more crowds to perform.

The task information describing a task may include, for example, a budget associated with the task (e.g., a quantity of money allotted for performance of the task), a duration of the task (e.g., one hour, one day, one worker hour, etc.), one or more skills associated with performing the task (e.g., expertise in a particular programming language, fluency in a particular language, a data entry speed, etc.), a description of the task (e.g., a textual description, an audio recording describing the task, a video related to the task, etc.), a task dependency that may identify one or more other tasks that rely on an output of the task, or the like.

In some implementations, the task information may identify a task confidentiality level. For example, if a task relates to confidential information, the task information may indicate to assign the task to crowds that are composed of workers that are associated with a non-disclosure agreement, workers that are employed by a company that provides the task information, workers that have a particular security clearance, or the like. As another example, if a task does not relate to confidential information, the task information may indicate to assign the task to any suitable crowd.

In some implementations, project manager device 210 may determine whether to assign a task to a crowd. For example, project manager device 210 may determine whether a task is appropriate for crowdsourcing (e.g., based on a deadline associated with the task, a budget of the task, a task confidentiality level of the task, a complexity of the task, a quantity of actions associated with performing the task, whether sufficient information has been provided to define the task, etc.). When project manager device 210 determines that the task is appropriate for crowdsourcing, project manager device 210 may perform operations described herein (e.g., providing task information to task analysis device 230, providing the task to one or more crowds, etc.).

When project manager device 210 determines that the task is inappropriate for crowdsourcing, project manager device 210 may provide information (e.g., to a user of project manager device 210, to task analysis device 230, etc.) indicating that the task is inappropriate for crowdsourcing, and may provide a reason. In this way, project manager device 210 may determine whether a task is appropriate for crowdsourcing. By determining whether the task is appropriate for crowdsourcing, project manager device 210 conserves processor and memory resources of crowd analysis device 220, task analysis device 230, and/or worker devices 240.

As further shown in FIG. 4, process 400 may include providing the task information to a task analysis device (block 420). For example, project manager device 210 may provide the task information to task analysis device 230. In some implementations, project manager device 210 may provide a subset of the information to task analysis device 230. Task analysis device 230 may analyze the task information and/or worker information obtained from crowd analysis device 220 to determine crowd recommendation information and/or worker recommendation information, as described in more detail below.

As further shown in FIG. 4, process 400 may include receiving crowd recommendation information identifying recommended crowds, of the one or more crowds, and task completion probabilities corresponding to the recommended crowds (block 430). For example, project manager device 210 may receive crowd recommendation information from task analysis device 230. Task analysis device 230 may determine the crowd recommendation information based on the task information and based on worker information describing past performance of worker devices 240, as described in more detail in connection with FIG. 5, below.

The crowd recommendation information may identify a task completion probability with regard to a task and one or more crowds. For example, assume that a set of worker devices 240 (e.g., a crowd) are associated with historically unreliable performance on tasks similar to a particular task (e.g., based on a percentage of tasks completed, based on a quality of work performed by the set of worker devices 240, etc.). In such a case, task analysis device 230 may determine a task completion probability, for the particular task and the set of worker devices 240, that is relatively low (e.g., as compared to a task completion probability for a set of worker devices 240 associated with historically reliable performance). In some implementations, the recommendation information may identify task completion probabilities for a particular task with regard to multiple, different worker devices 240 and/or sets of worker devices 240. For example, task analysis device 230 may determine task completion probabilities for a task with regard to several worker devices 240, and may provide recommendation information for the task that identifies the task completion probabilities, and that ranks the several worker devices 240 based on the task completion probabilities, as described in more detail in connection with FIG. 5, below.

As further shown in FIG. 4, process 400 may include determining whether one or more of the task completion probabilities satisfy a threshold probability (block 440). For example, project manager device 210 may determine a threshold probability for a particular task or set of tasks. In some implementations, the threshold probability may be a minimum task completion probability, below which project manager device 210 may determine that a task is inappropriate to be crowdsourced. Project manager device 210 may compare the task completion probabilities to the threshold probabilities, and may perform an action based on whether one or more of the task completion probabilities satisfy the threshold probability.

For example, assume that project manager device 210 provides task information describing Task A, and receives recommendation information that identifies Crowd 1, Crowd 2, Crowd 3, and Crowd 4. Assume that the recommendation information indicates that Crowds 1-4 are associated with task completion probabilities of 65%, 55%, 30%, and 25%, respectively. That is, task analysis device 230 predicts a 65% probability that Task A, if assigned to Crowd 1, will be completed by a worker associated with worker device 240-1.

As further shown in FIG. 4, if one or more of the task completion probabilities satisfies the threshold probability (block 440—YES), process 400 may include assigning the task to one or more selected workers, of the recommended workers (block 450). For example, assume, in the example involving Task A and Crowds 1-4, that project manager device 210 determines a threshold probability of 60%. In such a case, project manager device 210 may select Crowd 1, and may assign the task to one or more worker devices 240 associated with Crowd 1.

In some implementations, project manager device 210 may select crowds to perform a particular task. For example, project manager device 210 may select Crowd 1 and Crowd 2 in the above example, which may reduce time required to perform the task and increase a likelihood of the task being completed. In some implementations, project manager device 210 may select crowds based on a user interaction. For example, project manager device 210 may provide the task information, information identifying selected worker devices 240, and/or the recommendation information via a user interface, and may select one or more worker devices 240 based on a user interaction with the user interface.

In some implementations, project manager device 210 may assign tasks automatically (e.g., without user input). For example, project manager device 210 may generate task assignments automatically based on the recommendation information. In some implementations, project manager device 210 may provide information to a user identifying the task assignments, and may receive a user interaction to cause project manager device 210 to assign the tasks based on the task assignments. Additionally, or alternatively, project manager device 210 may assign the tasks without providing the information identifying the task assignments. For example, project manager device 210 may assign the tasks, and may send the tasks to worker devices 240 without providing information related to the task assignments, which may conserve processor resources.

As further shown in FIG. 4, process 400 may include receiving worker recommendation information identifying recommended worker devices associated with the recommended crowds (block 460). For example, project manager device 210 may provide the task to one or more selected crowds. One or more worker devices 240, of the one or more selected crowds, may selectively accept or reject the assigned task. For example, if a worker, associated with worker device 240, is unavailable to perform the assigned task, is unsatisfied by the budget associated with the assigned task, or the like, worker device 240 may reject the task. Project manager device 210 may receive worker recommendation information describing worker devices 240 that accept (or reject) the task from task analysis device 230 or from another device.

The worker recommendation information may identify the task and worker devices 240 to which the set of tasks are matched. In some implementations, the worker recommendation information may identify a particular worker device 240 to perform a particular task. Task analysis device 230 may determine the worker recommendation information based on which worker devices 240, of the worker devices 240 associated with the one or more crowds, apply to perform the task. For example, task analysis device 230 may receive information indicating which selected worker devices 240 apply to perform the task, and may determine information regarding the one or more worker devices 240 that have accepted the task, as described in more detail in connection with FIG. 6, below. Task analysis device 230 may determine a particular (e.g., improved, optimized, etc.) allocation of tasks to worker devices 240 that have accepted the tasks.

As further shown in FIG. 4, process 400 may include assigning the task to one or more of the identified worker devices (block 470). For example, project manager device 210 may assign the task to one or more of the worker devices 240 identified by the worker recommendation information. In some implementations, project manager device 210 may provide information identifying the task to the one or more worker devices 240, for the one or more worker devices 240 to perform the task.

In some implementations, project manager device 210 may assign a task to a second worker device 240 based on a first worker device 240 rejecting the task. For example, project manager device 210 may receive information indicating that the first worker device 240 rejected the task, and may identify the second worker device 240 based on the recommendation information. Project manager device 210 may select the second worker device 240 (e.g., automatically, without user input, based on user input, etc.).

As further shown in FIG. 4, if one or more of the task completion probabilities does not satisfy the threshold probability (block 440—NO), process 400 may include dividing the task into two or more tasks and returning to block 410 (block 480). For example, now assume, in the example involving Task A and Crowds 1-4, that project manager device 210 determines a threshold probability of 70%. In such a case, project manager device 210 compares the task completion probabilities of Crowd 1-4 to the threshold probability, and determines that no Crowd is associated with a task completion probability that satisfies the threshold probability. Accordingly, project manager device 210 may divide the task into two or more tasks (e.g., which may be more likely for Crowds 1-4 to complete), and may perform the operations described in connection with FIG. 4 (e.g., providing task information describing the two or more tasks to task analysis device 230, receiving recommendation information for the two or more tasks, determining whether task completion probabilities of the two or more tasks satisfy the probability threshold, selectively assigning the two or more tasks to worker devices 240 or further dividing the two or more tasks, etc.).

Project manager device 210 may divide the task into two or more sub-tasks to improve a probability that the task is completed, to cause the task to be completed sooner (e.g., by permitting crowds to perform the two or more sub-tasks simultaneously, rather than sequentially), or the like. In this way, project manager device 210 conserves processor resources that may otherwise be required to perform the task locally.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
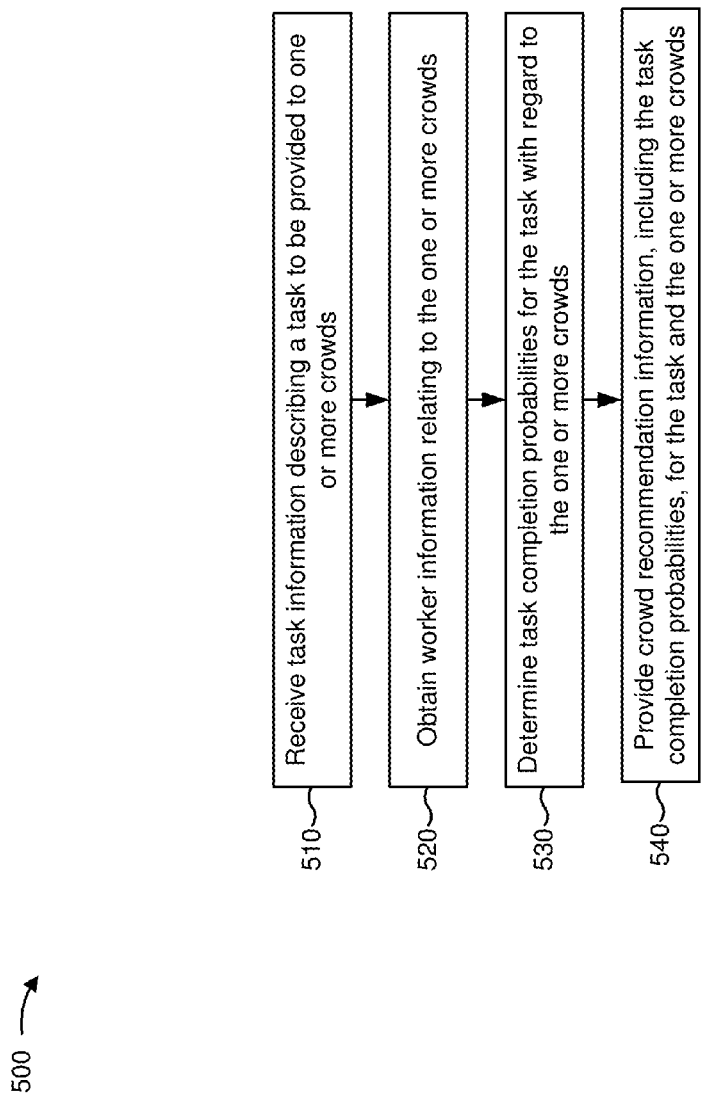
FIG. 5 is a flow chart of an example process for determining crowd recommendation information based on task information and worker information.

FIG. 5 is a flow chart of an example process 500 for determining crowd recommendation information based on task information and worker information. In some implementations, one or more process blocks of FIG. 5 may be performed by task analysis device 230. In some implementations, one or more process blocks of FIG. 5 may be performed by another device or a group of devices separate from or including task analysis device 230, such as project manager device 210, crowd analysis device 220, and/or worker device 240.

As shown in FIG. 5, process 500 may include receiving task information describing a task to be provided to one or more crowds (block 510). For example, task analysis device 230 may receive task information from project manager device 210. The task information may describe a set of tasks to possibly be performed by workers associated with one or more crowds. For example, the task information may identify respective budgets, skills, completion times, task confidentiality levels, or the like, of the set of tasks, as described in more detail in connection with block 410 of FIG. 4, above.

As further shown in FIG. 5, process 500 may include obtaining worker information relating to the one or more crowds (block 520). For example, task analysis device 230 may obtain worker information from crowd analysis device 220. The worker information may include information related to performance, skills, availability, etc. of one or more workers of the one or more crowds.

In some implementations, the task information may identify a set of crowds for which to obtain worker information. For example, project manager device 210 may provide task information identifying trusted crowds, crowds with which project manager device 210 has prior experience, crowds associated with a particular company, or the like. In such cases, task analysis device 230 may obtain worker information relating to the identified set of crowds.

Additionally, or alternatively, task analysis device 230 may determine crowds for which to obtain information. For example, task analysis device 230 may identify crowds based on a skill associated with performing a particular task, based on a task confidentiality level associated with a particular task, based on availability to perform the set of tasks in a particular period of time, or the like. Task analysis device 230 may obtain worker information associated with the identified crowds.

The worker information may include information indicating whether a worker/crowd is internal to an organization or external to an organization (e.g., an organization associated with project manager device 210, etc.), particular skills associated with the crowd and/or individual workers of the crowd (e.g., proficiency in a programming language, fluency in a spoken language, data entry speed, etc.), past performance of the worker/crowd (e.g., a percentage of past tasks completed by the worker, a reliability indicator indicating how likely the worker is to complete a task, quality of work associated with previously completed tasks, etc.), whether an organization associated with project manager device 210 has worked with the crowd in the past, a worker confidentiality level (e.g., based on whether the worker is associated with a non-disclosure agreement, a security clearance, etc.), or the like.

In some implementations, the worker information may indicate that a crowd includes subject matter experts for a certain subject matter, that workers of the crowd are associated with (e.g., employed by, etc.) a particular organization, that workers of the crowd volunteer for inclusion in the crowd, that workers of the crowd are competing for an employment offer from a particular organization, or the like.

In some implementations, the worker information may identify a crowdsourcing platform associated with a particular worker and/or crowd. For example, workers may obtain tasks via a crowdsourcing platform (e.g., oDesk, Clickworker, Elance, Upwork, Freelancer, etc.). When project manager device 210 provides a task to a crowd, project manager device 210 may provide the task by posting the task on the crowdsourcing platform and/or by providing the task to a particular worker via a crowdsourcing platform with which the particular worker is associated. Project manager device 210 may use the worker information that identifies the crowdsourcing platform to provide the task to workers. In some implementations, project manager device 210 may provide tasks to workers associated with different crowdsourcing platforms based on worker information identifying the different crowdsourcing platforms. In this way, project manager device 210 provides tasks to workers associated with different crowds or crowdsourcing platforms, based on worker information identifying the different crowds or crowdsourcing platforms, which increases a likelihood of the work being completed in a timely and efficient fashion.

In some implementations, crowd analysis device 220 may train a predictive model based on past performance of a set of worker devices 240 (e.g., a crowd). The predictive model may predict a result of assigning a particular task to a particular worker/crowd. To train the predictive model with regard to a particular crowd, crowd analysis device 220 may receive task information for tasks which the particular crowd has performed in the past, and may obtain performance information identifying performance, by the particular crowd and/or worker device 240 in the crowd, on the task. For example, the performance information may indicate whether the particular worker/crowd performed the task, a score related to the particular worker/crowd's performance, a length of time taken to perform the task and/or whether the task was completed within an allotted time, a billing rate associated with the particular worker/crowd (e.g., in dollars per hour, dollars per page, dollars per task, etc.), or the like.

As further shown in FIG. 5, process 500 may include determining task completion probabilities for the task with regard to the one or more crowds (block 530). For example, task analysis device 230 may determine task completion probabilities for the set of tasks. To determine the task completion probabilities for the set of tasks, task analysis device 230 may use a predictive model. For example, task analysis device 230, or another device, may train a predictive model, as described above, and may use the predictive model to determine a probability that a task is completed by a crowd, of the one or more crowds.

For a particular task and/or a particular crowd, task information and/or worker information may be input into the predictive model and the predictive model may output a probability that the particular crowd will complete the particular task. When the predictive model does not include information for the particular crowd, the predictive model may use information regarding crowds like the particular crowd (e.g., crowds with similar skills, similar availability, etc.) to determine a probability that the particular crowd will complete the task. In some implementations, the predictive model may output a predicted quality of performance (e.g., based on a measure of performance, based on past feedback associated with the particular crowd, etc.).

In some implementations, the predictive model may output a probability that any crowd will complete a particular task. Additionally, or alternatively, the predictive model may output a probability that a particular crowd will complete the particular task. For example, task information and worker information for the particular crowd may be input into the predictive model and the predictive model may output the probability that any worker, associated with the particular crowd, will complete the particular task.

As further shown in FIG. 5, process 500 may include providing crowd recommendation information, including the task completion probabilities, for the task and the one or more crowds (block 540). For example, task analysis device 230 may provide crowd recommendation information to project manager device 210. The crowd recommendation information may identify the set of tasks, crowds to which the set of tasks are matched, and/or task completion probabilities associated with each task/crowd. In some implementations, the recommendation information may identify a particular crowd to perform a particular task. For example, if the particular crowd is matched with the particular task, the recommendation information may recommend the particular crowd to perform the particular task. In this way, task analysis device 230 may recommend crowds to perform tasks based on task information, task completion probabilities, and/or worker information, which increases a likelihood that the tasks are completed in a timely and processor-efficient manner.

In some implementations, the recommendation information may rank tasks and/or crowds. For example, the recommendation information may rank crowds based on a probability of task completion associated with the crowds, may rank tasks based on a quantity of worker devices 240 associated with the crowds, may rank tasks based on a probability of task completion associated with the task, or the like. In this way, task analysis device 230 may recommend crowds to perform a task, in association with task completion probabilities corresponding to the recommended crowds, which increases a likelihood that the task is completed in a timely and processor-efficient manner.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
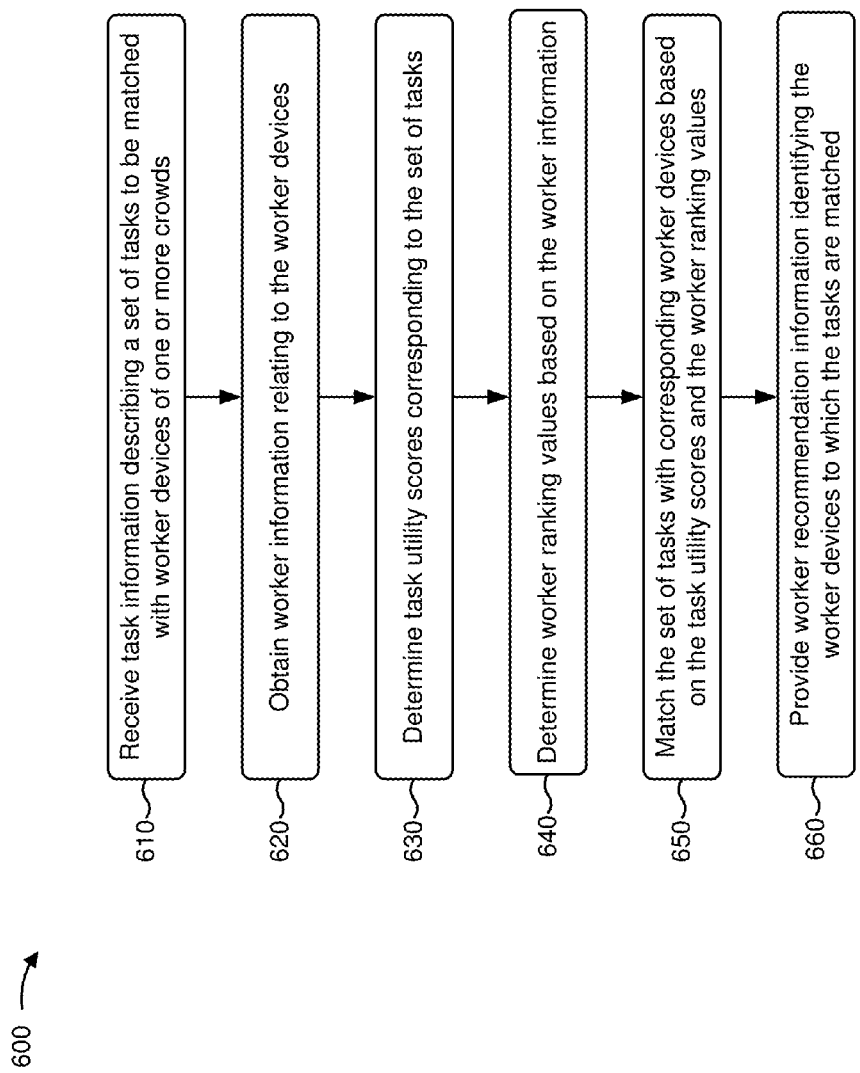
FIG. 6 is a flow chart of an example process for determining worker recommendation information based on task information and worker information.

FIG. 6 is a flow chart of an example process 600 for determining worker recommendation information based on task information and worker information. In some implementations, one or more process blocks of FIG. 6 may be performed by task analysis device 230. In some implementations, one or more process blocks of FIG. 6 may be performed by another device or a group of devices separate from or including task analysis device 230, such as project manager device 210, crowd analysis device 220, and/or worker device 240.

As shown in FIG. 6, process 600 may include receiving task information describing a set of tasks to be matched with worker devices of one or more crowds (block 610). For example, task analysis device 230 may receive task information from project manager device 210. The task information may describe a set of tasks to possibly be performed by workers associated with worker devices 240 of one or more crowds. For example, the task information may identify respective budgets, skills, completion times, task confidentiality levels, or the like, of the set of tasks, as described in more detail in connection with block 410 of FIG. 4, above.

As further shown in FIG. 6, process 600 may include obtaining worker information relating to the worker devices (block 620). For example, task analysis device 230 may obtain worker information from crowd analysis device 220. The worker information may include information related to performance, skills, availability, etc. of one or more workers. In some implementations, the worker information may relate to a crowd, which may include a group of workers, as described in more detail in connection with FIG. 5, above. Task analysis device 230 may obtain worker information for worker devices 240 that have applied to perform a task which has been provided to one or more crowds including the worker devices 240.

In some implementations, crowd analysis device 220 may train a predictive model based on past performance of a set of worker devices 240. The predictive model may predict a result of assigning a particular task to a particular worker/crowd. To train the predictive model with regard to a particular worker, crowd analysis device 220 may receive task information for tasks which the particular worker has performed in the past, and may obtain performance information identifying performance, by the particular worker, on the task. For example, the performance information may indicate whether the particular worker performed the task, a score related to the particular worker's performance, a length of time taken to perform the task and/or whether the task was completed within an allotted time, a billing rate associated with the particular worker (e.g., in dollars per hour, dollars per page, dollars per task, etc.), or the like.

As further shown in FIG. 6, process 600 may include determining task utility scores corresponding to the set of tasks (block 630). For example, task analysis device 230 may determine task utility scores corresponding to the set of tasks. In some implementations, task analysis device 230 may determine the task utility scores based on task information associated with the set of tasks. For example, with regard to a set of tasks, task analysis device 230 may determine a task utility score for a particular task based on a cost associated with the particular task and/or other tasks of the set of tasks, based on a duration associated with the particular task and/or other tasks of the set of tasks, based on a complexity of the particular task, or the like. By determining task utility scores for each task in a set of tasks, task analysis device 230 may rank the set of tasks according to task utility scores, which may permit task analysis device 230 to assign higher scoring tasks at a higher priority than lower scoring tasks.

To determine task utility scores for a set of tasks, task analysis device 230 may compare a cost associated with each task and a duration associated with each task. When a task is associated with a relatively high cost and duration, the task may be assigned a higher task utility than a task that is associated with a relatively low cost and duration. For a more detailed description of comparing costs and durations of a set of tasks to determine task utility scores, refer to FIGS. 7H and 7I, below.

In some implementations, task analysis device 230 may normalize cost values and/or duration values for a set of tasks. For example, a first task that is associated with a lowest cost (or duration) of a set of tasks may be assigned a first particular value, a second task that is associated with a highest cost (or duration) of a set of tasks may be assigned a second particular value, and tasks associated with intermediate costs (or durations) may be assigned values in between the first particular value and the second particular value.

In some implementations, task analysis device 230 may normalize cost values and duration values, and may combine (e.g., multiply, add, etc.) a normalized cost value with a normalized duration value for each task of the set of tasks. The combination of the normalized cost value and the normalized duration value may be used as the task utility score. Additionally, or alternatively, project manager device 210 may combine cost values and duration values without normalizing the duration values and cost values, which conserves processor resources of task analysis device 230.

As further shown in FIG. 6, process 600 may include determining worker ranking values based on the worker information (block 640). For example, task analysis device 230 may determine worker ranking values based on the worker information. Task analysis device 230 may determine the worker ranking values based on the worker information. For example, task analysis device 230 may compare skills of worker devices 240, availability of worker devices 240, task completion probabilities associated with worker devices 240, or the like. In some implementations, task analysis device 230 may rank worker devices 240 based on the worker ranking values. For example, a first worker device 240 that is associated with a more favorable worker ranking value may be ranked above a second worker device 240 with a less favorable worker ranking value.

In some implementations, task analysis device 230 may obtain the worker ranking values. For example, an entity associated with one or more worker devices 240 may provide worker ranking values (e.g., based on past worker performance information, based on skills associated with the one or more worker devices 240, etc.), and task analysis device 230 may obtain the worker ranking values (e.g., from the one or more worker devices 240, from a device associated with the entity, etc.). As another example, a user may input worker ranking values for particular worker devices 240 (e.g., based on past experience with the particular worker devices 240, based on evaluating capabilities of the particular worker devices 240, etc.).

As further shown in FIG. 6, process 600 may include matching the set of tasks with corresponding worker devices based on the task utility scores and the worker ranking values (block 650). For example, task analysis device 230 may match the set of tasks to worker devices 240 that have applied to perform the set of tasks based on the task utility scores and the worker ranking values. In some implementations, task analysis device 230 may match a task that is associated with a highest utility score to a worker device 240 that is associated with a highest worker ranking value, may assign a task that is associated with a second highest utility score to a worker device 240 that is associated with a second highest worker ranking value, and so on.

In some implementations, task analysis device 230 may match the set of tasks based on task information. For example, if a particular worker device 240 is not associated with a skill that is associated with a particular task, task analysis device 230 may not match the particular task to the particular worker device 240. As another example, if a billing rate associated with the particular worker device 240 is such that a budget of the particular task is likely to be exceeded, task analysis device 230 may not assign the particular task to the particular worker device 240.

In some implementations, task analysis device 230 may match a task with multiple worker devices 240. For example, the task information may indicate to match the task with multiple worker devices 240 (e.g., as many as possible, at least ten, the best matching five, etc.), and task analysis device 230 may accordingly match the task with multiple worker devices 240 (e.g., based on worker ranking values of the multiple worker devices 240, based on availability of the multiple worker devices 240, etc.). As another example, task analysis device 230 may match a task with a group of worker devices 240 (e.g., a group of worker devices 240 associated with a particular crowd and/or organization, a group of worker devices 240 associated with different crowds and/or organizations, etc.). Task analysis device 230 may determine the group of worker devices 240 based on worker information associated with the group of worker devices 240. For example, if task analysis device 230 determines that no existing crowd is a suitable match for a particular task, task analysis device 230 may match the particular task with a group of worker devices 240, of different crowds and/or organizations, to perform the particular task.

In some implementations, task analysis device 230 may match tasks to worker devices 240 based on a bipartite graph. For example, assume that task analysis device 230 is matching a set of tasks with a set of worker devices 240. Task analysis device 230 may generate a first partite set including the set of tasks, and may, in some implementations, rank the set of tasks based on utility scores corresponding to each of the set of tasks. Task analysis device 230 may generate a second partite set including the set of worker devices 240, and may, in some implementations, rank the set of worker devices 240 based on worker ranking values corresponding to each of the set of worker devices 240.

In this example, task analysis device 230 may match a highest-ranked task to a highest-ranked worker device 240, and may determine whether the match is valid (e.g., based on a budget of the highest-ranked task and a billing rate of the highest-ranked worker device 240, based on determining whether the highest-ranked worker device 240 is associated with skills associated with the highest-ranked task, etc.). If the match is valid, task analysis device 230 may generate an edge in a bipartite graph between the highest-ranked task and the highest-ranked worker device 240, and may match a second-highest-ranked task to a second-highest-ranked worker device 240. If the match is not valid, task analysis device 230 may match the highest-ranked task to the second-highest-ranked worker device 240, and may determine whether the match between the highest-ranked task and the second-highest-ranked worker device 240 is valid. Task analysis device 230 may perform similar operations for each task, of the set of tasks, to generate a bipartite graph of matches between the set of tasks and the set of worker devices 240. In some implementations, the bipartite graph may match a particular worker device 240 with multiple tasks, and/or may match multiple worker devices 240 with a particular task.

In some implementations, task analysis device 230 may match tasks to worker devices 240 and/or crowds from different organizations, different companies, or the like. For example, assume that an organization requires its workers to complete a non-disclosure agreement. If a first task requires workers associated with a non-disclosure agreement and a second task does not require workers associated with a non-disclosure agreement, task analysis device 230 may assign the first task to workers internal to the organization, and may assign the second task to workers external to the organization. In this way, task analysis device 230 may allocate tasks to different worker devices 240 and/or crowds to improve confidentiality of the tasks.

As further shown in FIG. 6, process 600 may include providing worker recommendation information identifying the worker devices to which the tasks are matched (block 660). For example, task analysis device 230 may provide worker recommendation information to project manager device 210. The worker recommendation information may identify the set of tasks and worker devices 240 to which the set of tasks are matched. In some implementations, the worker recommendation information may identify a particular worker device 240 to perform a particular task. For example, if the particular worker device 240 is matched with the particular task, the worker recommendation information may recommend the particular worker device 240 to perform the particular task. In this way, task analysis device 230 may recommend worker devices 240 to perform tasks based on task information and worker information, which increases a likelihood that the tasks are completed in a timely and processor-efficient manner.

In some implementations, task analysis device 230 may determine a task completion probability with regard to a particular worker device 240. For example, task analysis device 230 may apply a predictive model, based on the task assigned to the particular worker device 240, to predict a task completion probability with regard to the particular worker device 240. In this way, task analysis device 230 improves probability of task completion by determining worker devices 240 that are likely to perform the task.

In some implementations, the worker recommendation information may rank tasks and/or worker devices 240. For example, the worker recommendation information may rank worker devices 240 based on a probability of task completion associated with the worker devices 240, may rank tasks based on a quantity of worker devices 240 assigned to the tasks, may rank tasks based on a probability of task completion associated with the task, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7J are diagrams of an example implementation 700 relating to example processes 400, 500, and 600 shown in FIGS. 4-6. FIGS. 7A-7J show an example of determining task completion probabilities for crowds, and for selecting worker devices of the crowds to perform tasks based on recommendation information.

Figure 7A:
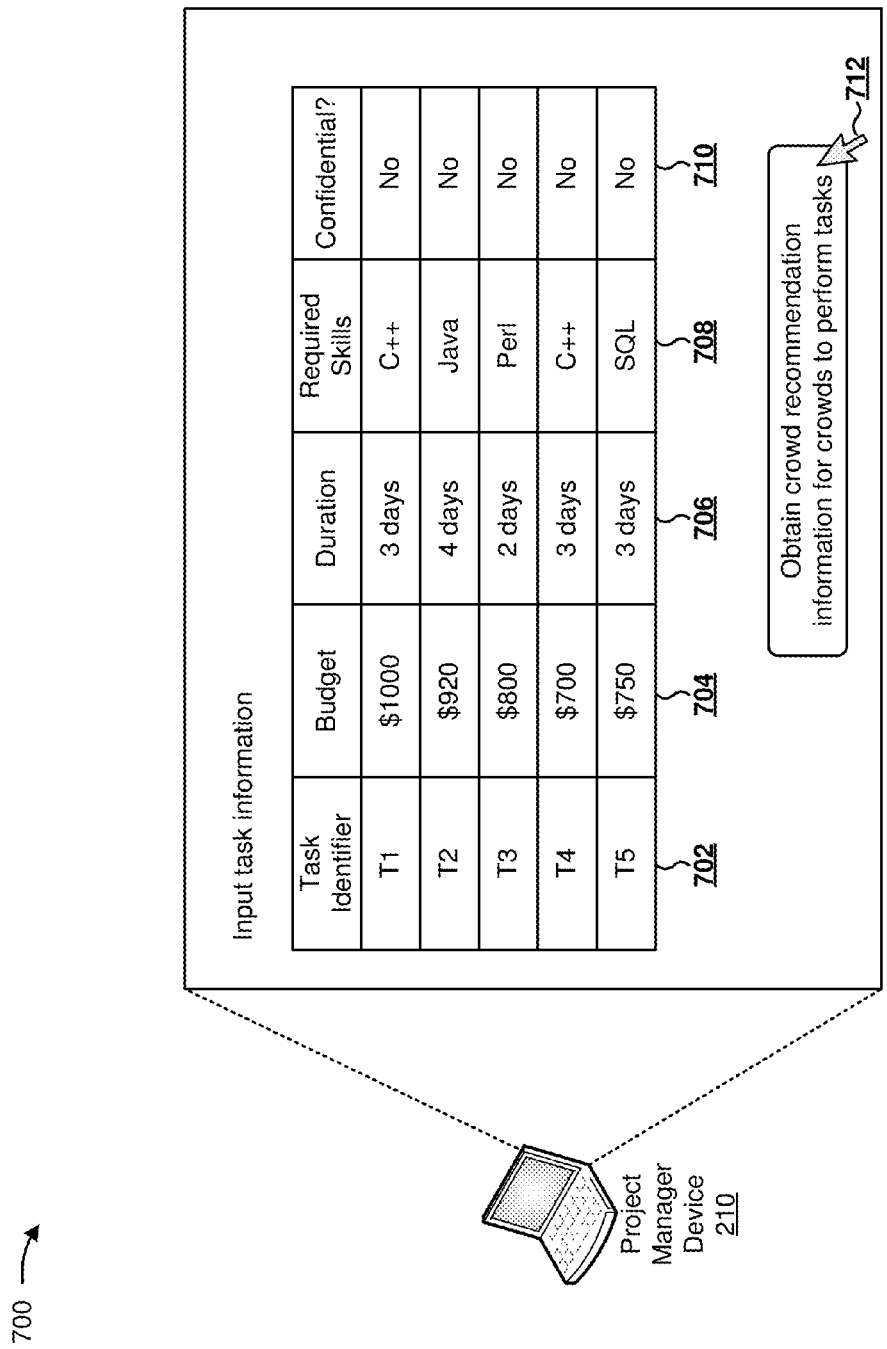

As shown in FIG. 7A, project manager device 210 may receive task information via a user input. As shown by reference number 702, project manager device 210 may receive task identifiers associated with five tasks to crowdsource (e.g., T1, T2, T3, T4, and T5). As shown by reference number 704, project manager device 210 may receive budgets associated with each task (e.g., $1000, $920, $800, $700, and $750, respectively).

As shown by reference number 706, project manager device 210 may receive information identifying durations associated with the five tasks (e.g., 3 days, 4 days, 2 days, 3 days, and 3 days, respectively). As shown by reference number 708, project manager device 210 may receive information identifying skills associated with the five tasks (e.g., programming languages, of C++, Java, Perl, C++ and SQL, respectively). As shown by reference number 710, the task information may indicate whether each task involves confidential information. Here, none of the five tasks involves confidential information. As shown by reference number 712, project manager device 210 may receive an interaction (e.g., selection of a button) to obtain recommendation information for a set of worker devices 240 to perform the tasks.

Figure 7B:
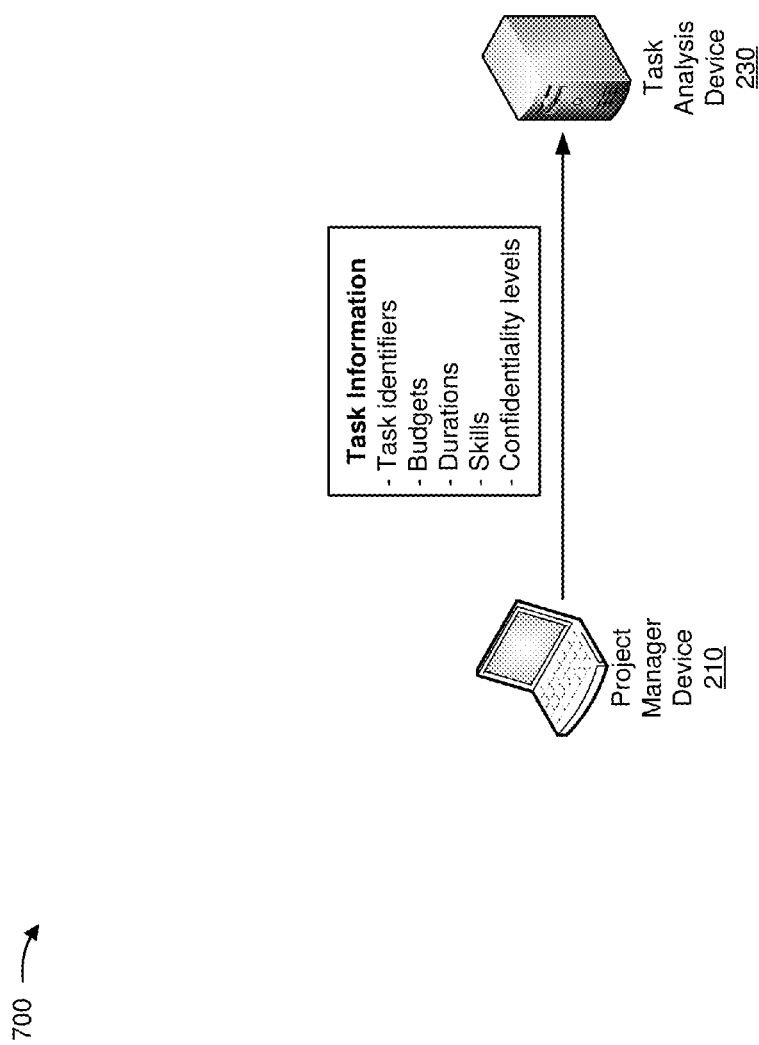

As shown in FIG. 7B, project manager device 210 may provide the task information to task analysis device 230. As further shown, the task information may include the task identifiers, the budgets, the durations, the skills, and the confidentiality levels for the tasks. As shown, task analysis device 230 receives the task information.

Figure 7C:
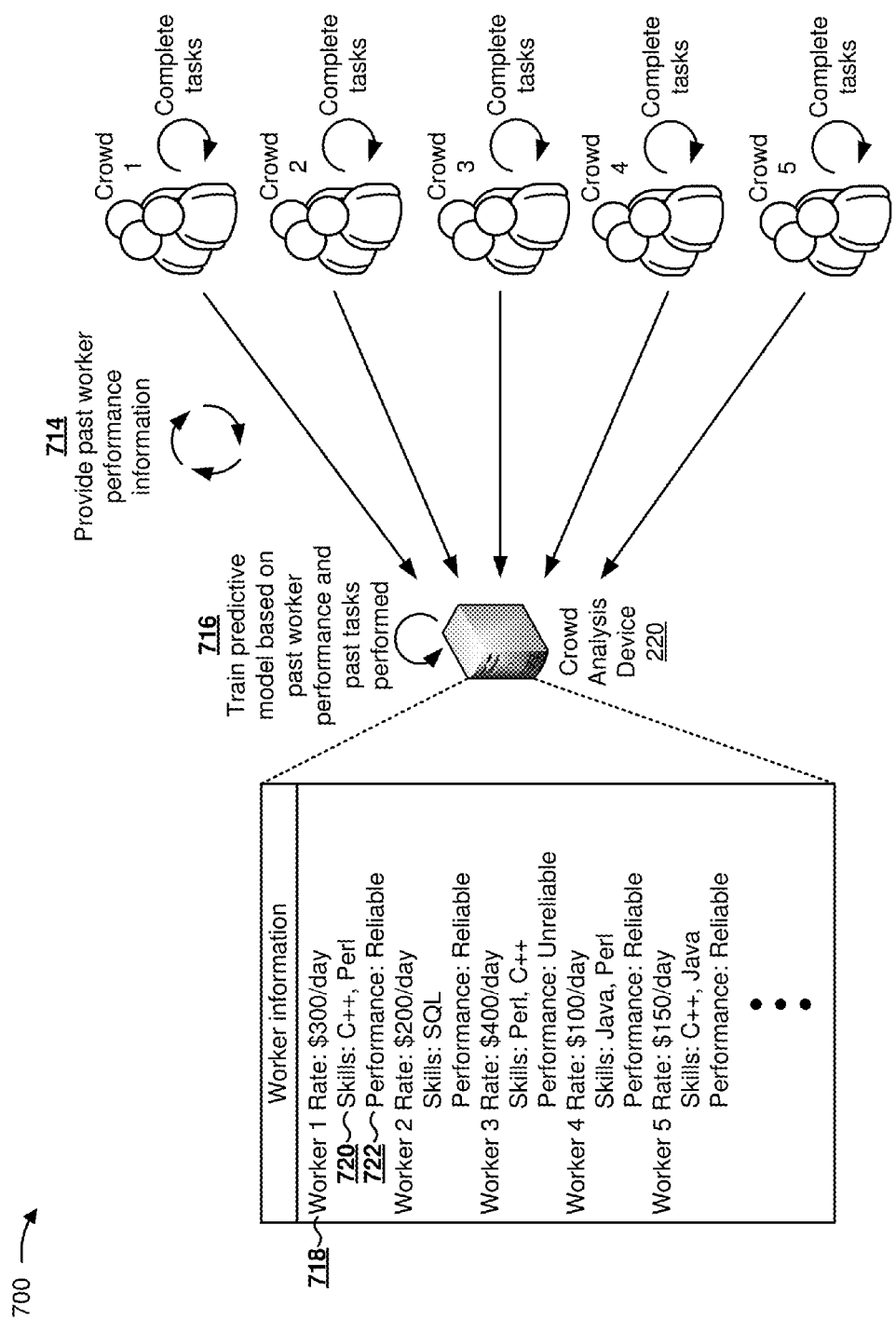

As shown in FIG. 7C, and by reference number 714, Crowds 1 through 5 may provide past worker performance information to crowd analysis device 220 (e.g., via one or more worker devices 240, etc.). The past worker performance information may relate to past performance of workers associated with Crowds 1-5. As shown by reference number 716, crowd analysis device 220 may train a predictive model based on the worker performance information and based on task information for tasks performed by workers associated with Crowds 1-5. The predictive model may predict performance, by particular worker devices 240 and/or Crowds 1-5, on a particular task. For example, based on task information for a particular task, the predictive model may predict a quality of performance, a likelihood of performance, or the like, when a particular worker device 240 or a particular crowd performs the task.

As shown, crowd analysis device 220 may store worker information for worker devices 240 that are associated with Crowds 1-5. As shown by reference number 718, the worker information may include a billing rate associated with each worker device 240. Here, worker device 240-1 is associated with a billing rate of $300/day, worker device 240-2 is associated with a billing rate of $200/day, worker device 240-3 is associated with a billing rate of $400/day, worker device 240-4 is associated with a billing rate of $100/day, and worker device 240-5 is associated with a billing rate of $150/day.

As shown by reference number 720, the worker information may identify skills associated with worker device 240. Crowd analysis device 220 may determine the skills based on information provided by worker device 240, based on past tasks completed by worker device 240, or the like. Here, worker device 240-1 is associated with a programming language skill in C++ and Perl, worker device 240-2 is associated with a programming language skill in SQL, worker device 240-3 is associated with a programming language skill in Perl and C++, worker device 240-4 is associated with a programming language skill in Java and Perl, and worker device 240-5 is associated with a programming language skill in C++ and Java.

As shown by reference number 722, the worker information may include performance information. The performance information may indicate a quality of work, a quantity of work performed, a likelihood of particular work being performed, or the like. In some implementations, crowd analysis device 220 may determine the performance information based on the past worker performance information. For example, crowd analysis device 220 may determine the performance information by aggregating past worker performance information, or the like. Additionally, or alternatively, worker device 240 or a device associated with worker device 240 may provide the performance information. For example, an administrator of worker device 240 may track the performance information, and may cause worker device 240 to provide the performance information. In some implementations, feedback on prior performed tasks can be used as past worker performance information (e.g., a quality of an output of the prior performed tasks, etc.).

As shown, worker devices 240-1, 240-2, 240-4, and 240-5 are associated with performance information of "reliable," and worker device 240-3 is associated with performance information of "unreliable." Based on the performance information, task analysis device 230 may determine task completion probabilities. For example, task analysis device 230 may determine that crowds including reliable worker devices 240 are more likely to complete a task than crowds including unreliable worker devices 240, and may adjust task completion properties related to the reliable worker devices 240 and/or the unreliable worker devices 240 accordingly.

Figure 7D:
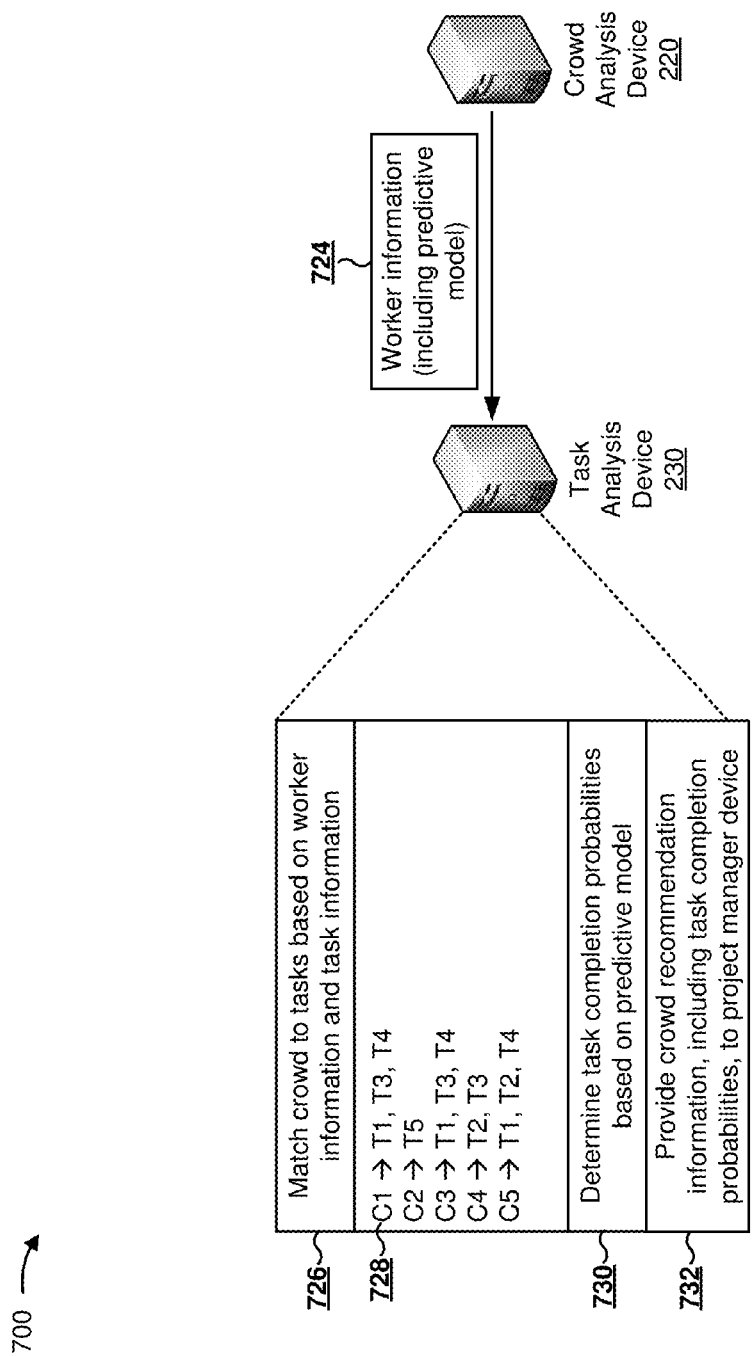

As shown in FIG. 7D, and by reference number 724, crowd analysis device 220 may provide worker information, including the predictive model, to task analysis device 230. In some implementations, crowd analysis device 220 may determine particular worker information to provide. For example, task analysis device 230 may provide task information indicating budget requirements, skills, or the like, and crowd analysis device 220 may select particular worker devices 240 based on the particular worker devices 240 satisfying the budget requirements, the skills, or the like.

As shown by reference number 726, task analysis device 230 may match Crowds 1-5 to tasks T1 through T5. As shown by reference number 728, Crowd 1 is matched to tasks T1, T3 and T4. Assume that Crowd 1 is matched to tasks T1, T3, and T4 based on Crowd 1 including workers associated with the skills required by tasks T1, T3, and T4. As further shown, Crowd 2 is matched with task T5, Crowd 3 is matched with tasks T1, T3, and T4, Crowd 4 is matched with tasks T2 and T3, and Crowd 5 is matched with tasks T1, T2, and T4.

As shown by reference number 730, project manager device 210 may determine task completion probabilities for Tasks T1 through T5 with regard to Crowds 1 through 5. As further shown, project manager device 210 may determine the task completion probabilities based on the predictive model received from crowd analysis device 220. For example, project manager device 210 may determine completion probabilities for Crowd 1 with regard to each of task T1, task T3, and task T4, based on the predictive model for workers associated with Crowd 1 and based on task information for task T1, task T3, and task T4.

As shown by reference number 732, task analysis device 230 may provide crowd recommendation information to project manager device 210. As further shown, the crowd recommendation information may include the task completion probabilities. In some implementations, the crowd recommendation information may include other information, such as a recommended crowd to which to provide each task.

Figure 7E:
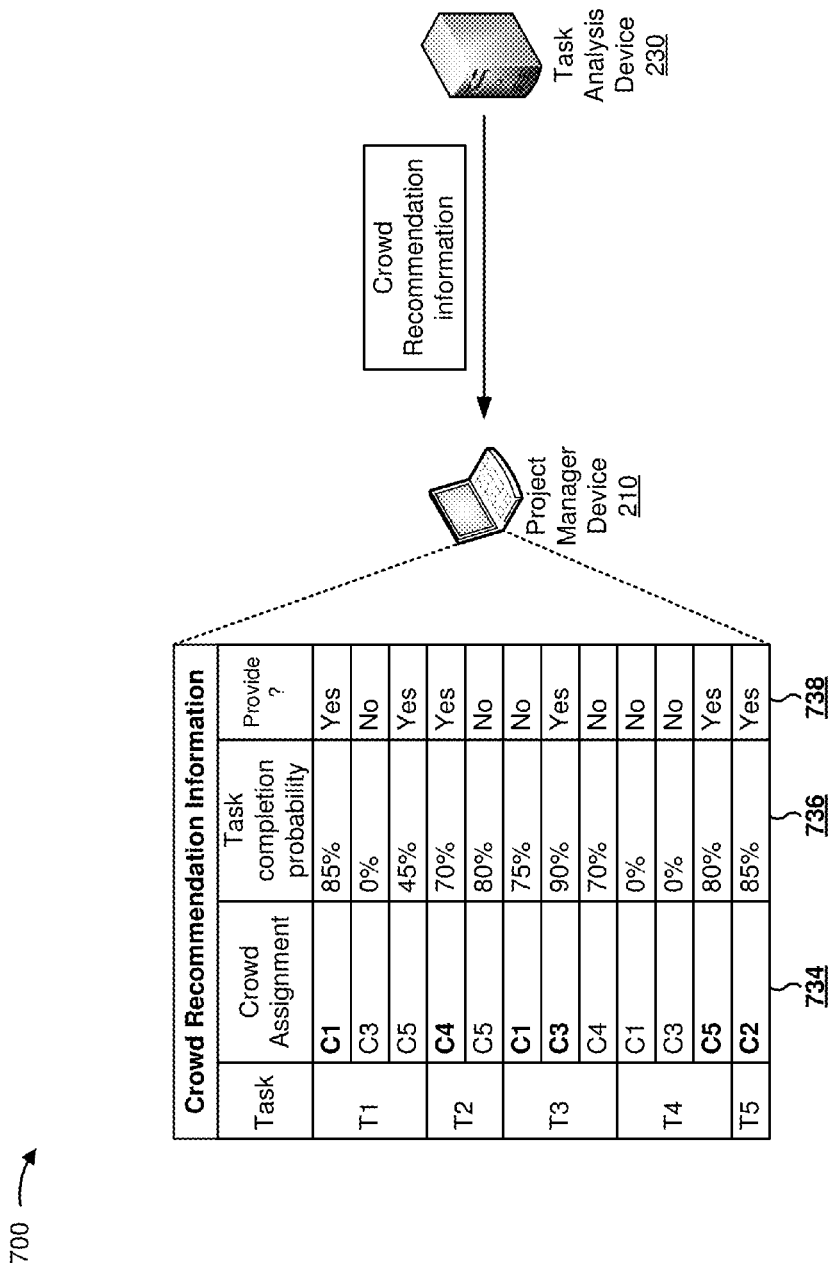

As shown in FIG. 7E, project manager device 210 may receive the crowd recommendation information. As shown by reference number 734, the recommendation information may recommend a particular crowd, of Crowds 1-5, to which to provide each task. Here, a recommended crowd is indicated by a bold face font. As shown, task analysis device 230 recommends Crowd 1 for task T1, Crowd 4 for task T2, Crowd 3 for task T3, Crowd 5 for task T4, and Crowd 2 for task T5.

As shown by reference number 736, the recommendation information may include the task completion probabilities for each task. Task analysis device 230 may determine the task completion probabilities based on the predictive models associated with Crowds 1-5. As shown, in some cases (e.g., task T1/Crowd 3, task T4/Crowd 1, and task T4/Crowd 3), the task completion probability may be 0% based on, for example, Crowds 1 and/or 3 being associated with billing rates that exceed budgets associated with tasks T1 and/or T4.

As shown by reference number 738, project manager device 210 may provide certain tasks to certain crowds. Here, project manager device 210 provides task T1 to Crowds 1 and 5, task T2 to Crowd 4, task T3 to Crowd 3, task T4 to Crowd 5, and task T5 to Crowd 2. As shown, project manager device 210 may assign a task (e.g., task T1) to multiple crowds. In this way, project manager device 210 may increase a likelihood that the task is completed on time.

In some implementations, project manager device 210 may assign the tasks automatically (e.g., without user input). For example, project manager device 210 may assign the tasks based on the task completion probabilities or based on other information. Additionally, or alternatively, project manager device 210 may assign the tasks based on user input. For example, a user may input information indicating tasks to assign to particular crowds.

Figure 7F:
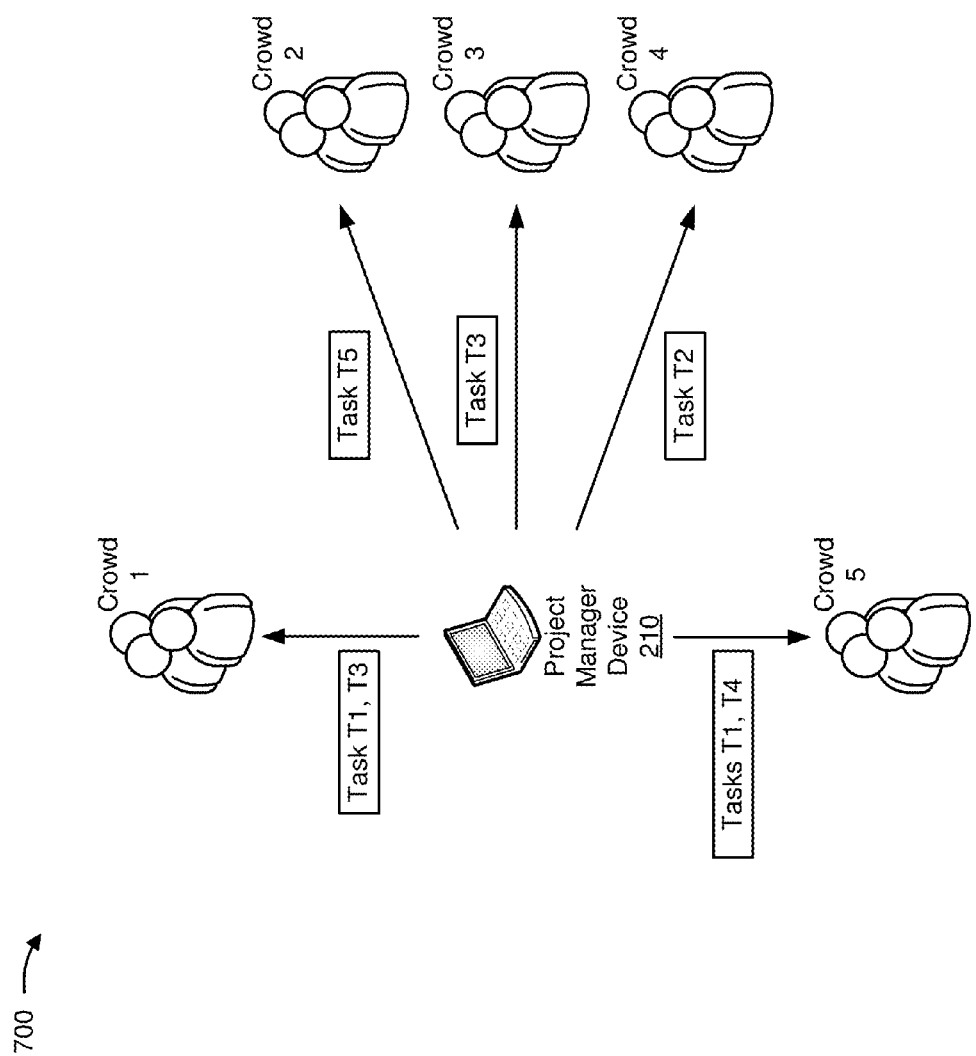

As shown in FIG. 7F, project manager device 210 may provide tasks T1-T5 to Crowds 1 through 5. As further shown, project manager device 210 provides task T1 to Crowds 1 and 5, task T5 to Crowd 2, task T3 to Crowds 1 and 3, task T2 to Crowd 4, and task T4 to Crowd 5.

Figure 7G:
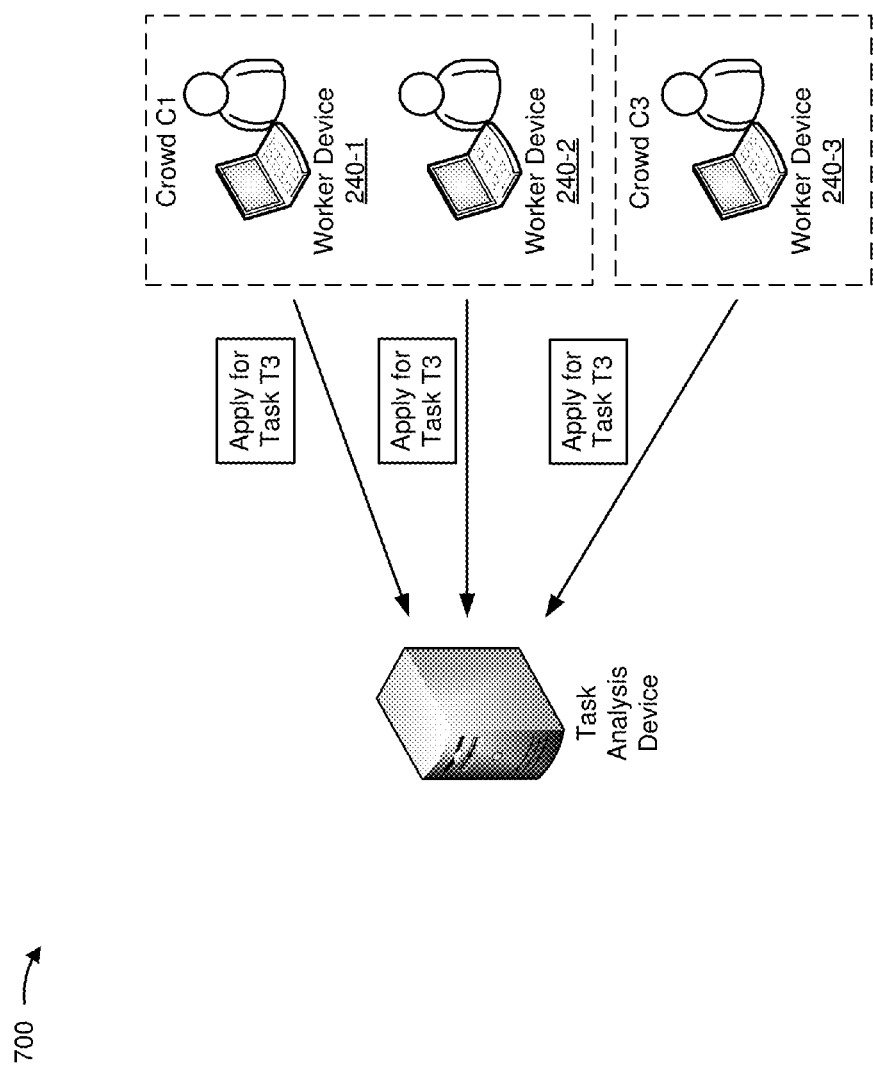

As shown in FIG. 7G, task analysis device 230 may receive information identifying worker devices 240 that have applied to perform tasks. Here, worker devices 240-1 and 240-2, associated with Crowd 1, apply to perform Task T3, and worker device 240-3, associated with Crowd 3, applies to perform Task T3.

As shown in FIG. 7H, task analysis device 230 may normalize duration values and the cost values associated with tasks T1-T5. Task analysis device 230 may normalize the duration values and the cost values to match the tasks to worker devices 240. As shown by reference number 740, task analysis device 230 may normalize duration values to a minimum value of 20 and a maximum value of 100. Task analysis device 230 may receive the minimum value and the maximum value via user input, may determine the minimum value and the maximum value based on a default rule, or the like. As shown by reference number 742, in some implementations, task analysis device 230 may normalize the duration information for a particular task based on the following equation:

$$D_{norm,i} = \min + \frac{(D_{max} - D_i)}{(D_{max} - D_{min})} * (\max - \min)$$

In the above equation, $D_{norm,i}$ identifies a normalized value for a particular task, min identifies the minimum value (e.g., 20), max identifies the maximum value (e.g., 100), $D_{max}$ identifies a maximum duration value of the five tasks (e.g., 4 days, as shown by reference number 706 of FIG. 7A), $D_i$ identifies a duration value of the particular task, and $D_{min}$ identifies a minimum duration value of the five tasks (e.g., 2 days, as shown by reference number 706 of FIG. 7A). As shown by reference number 744, task analysis device 230 may compute normalized duration values for T1 through T5. As shown by reference number 746, T1 is associated with a normalized duration value of 70, T2 is associated with a normalized duration value of 20, T3 is associated with a normalized duration value of 100, T4 is associated with a normalized duration value of 70, and T5 is associated with a normalized duration value of 70.

As shown by reference number 748, to compute normalize cost values, task analysis device 230 may divide tasks T1-T5 into buckets based on durations associated with tasks T1-T5. As shown by reference number 750, task analysis device 230 may divide tasks T1-T5 into three buckets: a first bucket D=2 that includes T3, a second bucket D=3 that includes T1, T4, and T5, and a third bucket D=4 that includes T2. As shown by reference number 752, project manager device 210 may normalize costs of tasks that are included in buckets of multiple tasks based on a minimum value of 20 and a maximum value of 100.

As shown by reference number 754, in some implementations, task analysis device 230 may normalize the task information for a particular bucket based on the following equation:

$$C_{norm,i} = \min + \frac{(C_i/D_i - C_{min}/D_i)}{(C_{max}/D_i - C_{min}/D_i)} * (\max - \min)$$

In the above equation, $C_{norm,i}$ identifies a normalized cost value for a particular task, min identifies the minimum value (e.g., 20), max identifies the maximum value (e.g., 100), $C_{max}$ identifies a maximum cost value of tasks in the particular bucket (e.g., 1000, as shown by reference number 704 of FIG. 7A), $C_i$ identifies a cost value of the particular task, and $C_{min}$ identifies a minimum cost value of tasks in the particular bucket (e.g., 700). As shown by reference number 756, task analysis device 230 may compute normalized cost values for T1 through T5. As shown by reference number 758, T1 is associated with a normalized cost value of 100, T2 is associated with a normalized cost value of 85.7, T3 is associated with a normalized duration value of 43.5, T4 is associated with a normalized cost value of 20, and T5 is associated with a normalized cost value of 60.

Here, T2 and T3 are associated with buckets of only one task. Assume that the normalized costs associated with T2 and T3 are computed based on other tasks associated with durations that match the durations of T2 and T3. Here, the other tasks are not shown for purposes of simplicity.

Figure 7I:
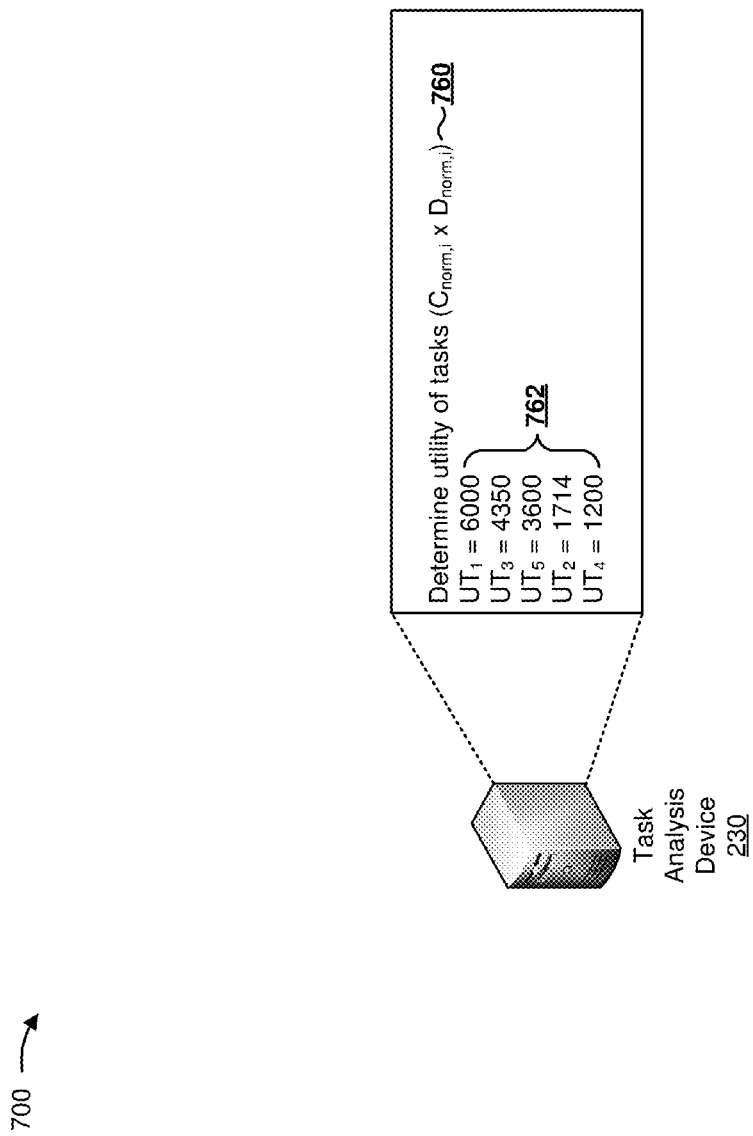

As shown in FIG. 7I, task analysis device 230 may determine task utility scores for tasks T1 through T5. As shown by reference number 760, task analysis device 230 may determine the task utility scores based on the operation $C_{norm,i} \times D_{norm,i}$. As shown by reference number 762, task analysis device 230 may rank tasks T1 through T5 based on task utility scores of the tasks. Here, T1 is associated with a task utility score of 6000, T2 is associated with a task utility score of 1714, T3 is associated with a task utility score of 4350, T4 is associated with a task utility score of 1200, and T5 is associated with a task utility score of 3600. In some implementations, task analysis device 230 may prioritize a task with a higher task utility score over a task with a lower utility score. For example, if task analysis device 230 matches a particular worker device 240 with two tasks, and the particular worker device 240 is capable of performing only one task, task analysis device 230 may choose which of the two tasks to assign to the particular worker device 240 based on task utility scores associated with the two tasks.

Figure 7J:
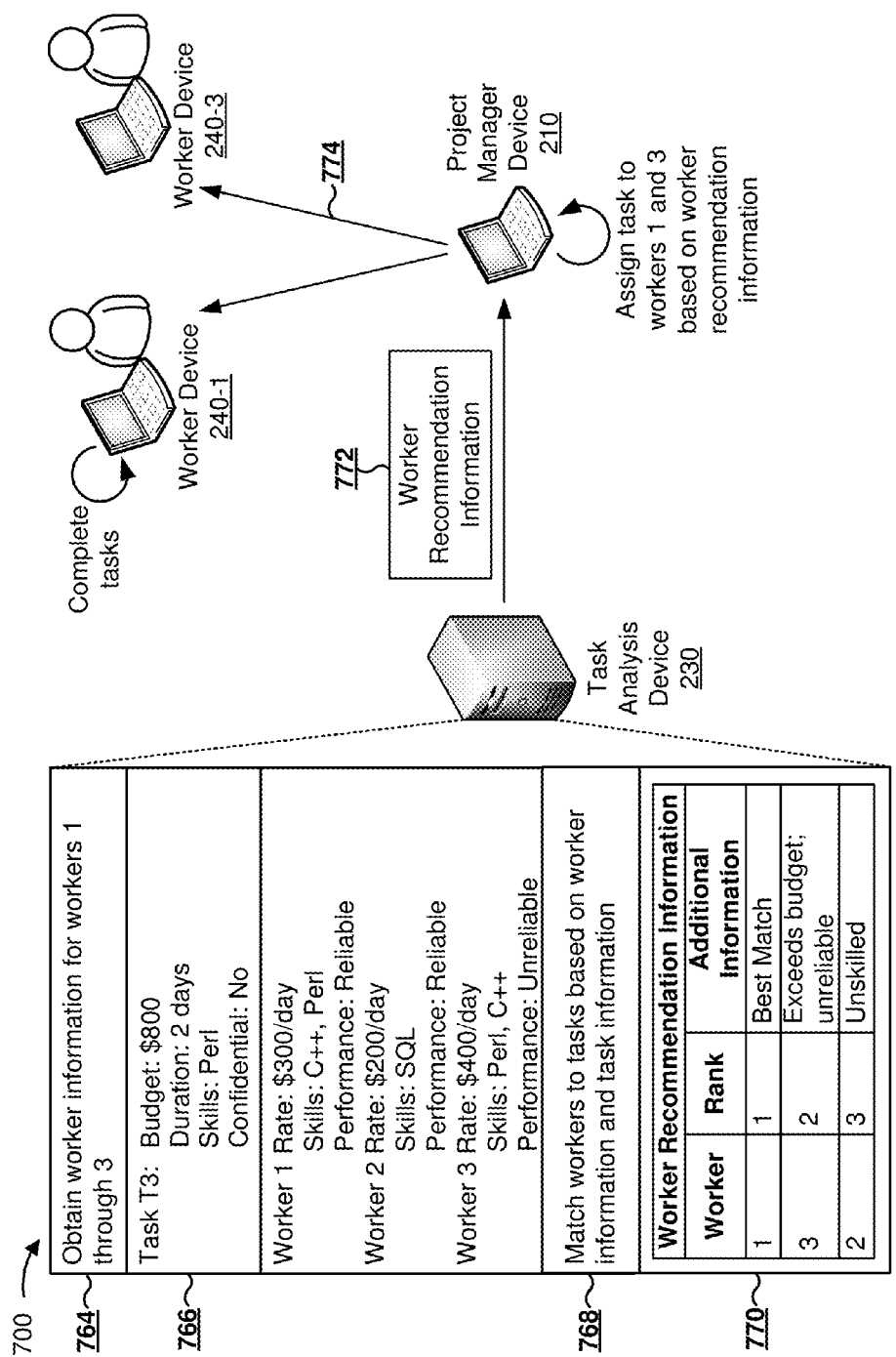

As shown in FIG. 7J, and by reference number 764, task analysis device 230 may obtain worker information relating to worker devices 240-1 through 240-3 (e.g., based on worker devices 240-1 through 240-3 being associated with workers 1 through 3). As shown by reference number 766, Task T3 may be associated with a budget of $800, a duration of two days, a required skill in the Perl programming language, and no confidentiality level.

As shown by reference number 768, task analysis device 230 may determine worker recommendation information for worker devices 240-1 through 240-3 with regard to Task T3 based on the worker information and based on the task information. As shown by reference number 770, task analysis device 230 may determine worker recommendation information. As shown, the worker recommendation information may rank worker devices 240-1 through 240-3 based on the worker information and the task information. As further shown, the worker recommendation information that worker device 240-1 is a best match, may determine that worker device 240-3 exceeds the budget associated with Task T3 and is unreliable, and may determine that worker device 240-3 is unskilled in the Perl programming language.

As shown by reference number 772, task analysis device 230 may provide the worker recommendation information to project manager device 210. As further shown, project manager device 210 assigns Task T3 to workers associated with worker devices 240-1 and 240-3 based on the worker recommendation information. As shown by reference number 774, project manager device 210 provides the tasks to worker devices 240-1 and 240-3, to complete the tasks.

As indicated above, FIGS. 7A-7J are provided merely as an example. Other examples are possible and may differ from what was described with regard to FIGS. 7A-7J.

In this way, project manager device 210 may select worker devices 240 from a variety of organizations to which to crowdsource tasks. By selecting worker devices 240 based on task completion probabilities and/or recommendation information identifying recommended worker devices 240, project manager device 210 may more efficiently crowdsource tasks, and may provide the tasks to worker devices 240 that are well suited to the task, and thus more likely to perform the task satisfactorily.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive task information describing one or more tasks to be performed by one or more workers, of a plurality of workers associated with one or more crowds;
obtain worker information describing the plurality of workers and/or the one or more crowds;
determine one or more task completion probabilities based on the task information and the worker information,
the one or more task completion probabilities being based on a predictive model,
the predictive model being trained to predict task completion probabilities, for a given worker or crowd, based on given task information,
a task completion probability, of the one or more task completion probabilities, identifying a likelihood that a particular crowd, of the one or more crowds, will complete a particular task that is provided to the particular crowd,
the one or more tasks being divided into two or more subtasks when the task completion probability does not meet a threshold to allow the two or more subtasks to be performed simultaneously;
receive crowd recommendation information based on the one or more task completion probabilities, the task information, and/or the worker information,
the crowd recommendation information identifying one or more recommended crowds, of the one or more crowds, to which the one or more tasks are recommended to be provided;
provide the one or more tasks to the one or more recommended crowds,
a task of the one or more tasks being assigned to multiple crowds of the one or more recommended crowds;
receive worker recommendation information associated with the one or more recommended crowds,
the worker recommendation information including information associated with matching one or more workers of the one or more recommended crowds with corresponding tasks of the one or more tasks based on task utility scores and worker ranking values,
the task utility scores being determined based on duration values and costs values associated with the one or more tasks,
the duration values being normalized based on a maximum value and a minimum value,
the cost values being normalized based on a maximum value and a minimum value,
the duration values and the cost values being combined to determine the task utility scores,
the worker ranking values being determined based on at least one of:
past worker performance information associated with at least one of the plurality of workers, or
information included in the worker information;
assign the one or more tasks to the one or more workers of the one or more recommended crowds based on the worker recommendation information;
receive past worker performance information of the one or more tasks by the one or more workers of the one or more recommended crowds,
the past worker performance information including:
first information related to completion of the task, and
second information related to a score associated with a quality of completed and/or incomplete tasks; and
update the predictive model to predict task completion probabilities based upon the past worker performance information of the one or more tasks by the one or more workers of the one or more recommended crowds.

2. The device of claim 1, where the one or more workers are included in the one or more recommended crowds.

3. The device of claim 2, where
the one or more workers are matched based on one or more billing rates associated with the one or more workers and based on one or more budgets associated with the one or more tasks,
the one or more billing rates being identified by the worker information and the one or more budgets being identified by the task information.

4. The device of claim 1, where the worker information includes at least one of:
information indicating that a worker is associated with a particular organization, information identifying particular skills associated with a worker, information indicating that a worker is associated with a worker confidentiality level, past worker performance information associated with a worker, a crowdsourcing platform associated with a worker, or a billing rate associated with a worker.

5. The device of claim 1, where the one or more task completion probabilities are first task completion probabilities; and where the one or more processors are to:
receive information indicating that a particular worker, of the one or more recommended crowds, has applied for the one or more tasks;
determine one or more second task completion probabilities relating to the particular worker and the one or more tasks based on the predictive model; and
provide the one or more second task completion probabilities.

6. The device of claim 1, where a first subtask of the two or more subtasks is assigned to a first worker, and a second subtask of the two or more subtasks are assigned to a second work.

7. The device of claim 1, where at least one subtask, of the two or more subtasks, is further divided when a task completion probability of the at least one subtask, of the two or more subtasks, does not meet the threshold.

8. A method, comprising:
receiving, by a device, task information identifying a plurality of tasks to be performed by one or more workers, of a plurality of workers associated with a plurality of crowds;
obtaining, by the device, worker information describing the plurality of workers;
determining, by the device, a plurality of task completion probabilities based on the task information and the worker information,
the plurality of task completion probabilities being based on a predictive model,
the predictive model being trained to predict task completion probabilities, for a given worker or crowd, based on given task information,
a task completion probability, of the plurality of task completion probabilities, identifying a likelihood that a particular crowd, of the plurality of crowds, will complete a particular task that has been provided to the particular crowd,
one or more tasks of the plurality of tasks being divided into two or more subtasks when the task completion probability does not meet a threshold to allow the two or more subtasks to be performed simultaneously;
receiving, by the device, crowd recommendation information based on the plurality of task completion probabilities, the task information, and/or the worker information,
the crowd recommendation information identifying recommended crowds, of the plurality of crowds, to which a task, of the plurality of tasks, is recommended to be provided;
providing, by the device, the plurality of tasks to the one or more recommended crowds,
a task of the plurality of tasks being assigned to multiple crowds of the one or more recommended crowds;
receiving, by the device, worker recommendation information associated with the one or more recommended crowds,
the worker recommendation information including information associated with matching one or more workers of the one or more recommended crowds with corresponding tasks of the plurality of tasks based on task utility scores and worker ranking values,
the task utility scores being determined based on duration values an cost values associated with the one or more tasks,
the duration values being normalized based on a maximum value and a minimum value,
the cost values being normalized based on a maximum value and a minimum value,
the duration values and the cost values being combined to determine the task utility scores,
the worker ranking values being determined based on at least one of:
past worker performance information associated with at least one of the plurality of workers, or
information included in the worker information;
assigning, by the device, the plurality of tasks to the one or more workers of the one or more recommended crowds based on the worker recommendation information;
receiving, by the device, past worker performance information of the plurality of tasks by the one or more workers of the one or more recommended crowds,
the past worker performance information including:
first information related to completion of the task, and
second information related to a score associated with a quality of completed and/or incomplete tasks; and
updating, by the device, the predictive model to predict task completion probabilities based upon the past worker performance information of the plurality of tasks by the one or more workers of the one or more recommended crowds.

9. A non-transitory computer-readable medium storing instructions, the instructions comprising:
one or more instructions that, when executed by one or more processors of one or more devices, cause the one or more processors to:
receive task information identifying a task to be performed by one or more workers, of a plurality of workers associated with one or more crowds;
obtain worker information associated with the plurality of workers;
determine a plurality of task completion probabilities based on the task information and the worker information,
the plurality of task completion probabilities being based on a predictive model,
the predictive model being trained to predict task completion probabilities, for a given worker or crowd, based on given task information,
a task completion probability, of the plurality of task completion probabilities, identifying a likelihood that a particular crowd, of the one or more crowds, will complete the task,
the task being divided into two or more subtasks when the task completion probability does not meet a threshold to allow the two or more subtasks to be performed simultaneously; and receive crowd recommendation information based on the plurality of task completion probabilities, the task information, and/or the worker information,
the crowd recommendation information identifying recommended crowds, of the one or more crowds, to which the task is recommended to be provided;
provide the task to the one or more recommended crowds,
the task being assigned to multiple crowds of the one or more recommended crowds;
receive worker recommendation information associated with the one or more recommended crowds,
the worker recommendation information including information associated with matching one or more workers of the one or more recommended crowds with the task based on task utility scores and worker ranking values,
the task utility scores being determined based on duration values and cost values associated with the task,
the duration values being normalized based on a maximum value and a minimum value,
the cost values being normalized based on a maximum value and a minimum value,
the duration values and the cost values being combined to determine the task utility scores,
the worker ranking values being determined based on at least one of:
past worker performance information associated with at least one of the plurality of workers, or
information included in the worker information;
assign the task the one or more workers of the one or more recommended crowds based on the worker recommendation information;
receive past worker performance information of the task by the one or more workers of the one or more recommended crowds,
the past worker performance information including:
first information related to completion of the task, and
second information related to a score associated with a quality of completed and/or incomplete tasks; and
update the predictive model to predict task completion probabilities based upon the past worker performance information of the task by the one or more workers of the one or more recommended crowds.

10. The non-transitory computer-readable medium of claim 9,
where the predictive model generates a task completion probability for a given task, with regard to the particular crowd, based on the past worker performance information associated with the particular crowd.

11. The non-transitory computer-readable medium of claim 10, where the worker information is first worker information, and
where the one or more instructions, when executed by the one or more processors, cause the one or more processors to:
obtain second worker information,
the second worker information describing performance of the plurality of workers with regard to a task; and
train the predictive model based on the second worker information.

12. The non-transitory computer-readable medium of claim 9, where the task information identifies a budget associated with the task, and where the worker information identifies billing rates associated with the plurality of workers; and
where the one or more instructions, when executed by the one or more processors, cause the one or more processors to:
match one or more of the plurality of workers with the task,
the one or more of the plurality of workers being matched with the task based on a likelihood of the billing rates causing the budget to be exceeded.

13. The non-transitory computer-readable medium of claim 12, where the one or more instructions, when executed by the one or more processors, cause the one or more processors to:
determine that the task information identifies a task confidentiality level that is associated with the task; and
where the one or more instructions, that cause the one or more processors to match the one or more of the plurality of workers with the task, cause the one or more processors to:
determine a worker confidentiality level associated with a worker; and
match the worker with the task when the worker confidentiality level exceeds or equals the task confidentiality level.

14. The non-transitory computer-readable medium of claim 12, where the one or more instructions, that cause the one or more processors to match the one or more workers, cause the one or more processors to:
match the task with at least two workers,
a first worker, of the at least two workers, being associated with a first crowd, and
a second worker, of the at least two workers, being associated with a second crowd,
the first crowd being a different crowd than the second crowd.

15. The non-transitory computer-readable medium of claim 12, where the one or more devices are associated with a particular organization; and
where the one or more instructions, when executed by the one or more processors, cause the one or more processors to:
selectively match the task to one or more internal workers, of the plurality of workers, or one or more external workers, of the plurality of workers, based on the task information,
the one or more internal workers being associated with the particular organization, and the one or more external workers being associated with another organization.

16. The non-transitory computer-readable medium of claim 9, where the one or more instructions, when executed by the one or more processors, cause the one or more processors to:
determine whether the task is appropriate for crowdsourcing based on the task information; and
selectively obtain worker information or provide information indicating that the task is inappropriate for crowdsourcing based on whether the task is appropriate for crowdsourcing,
the worker information being obtained when the task is appropriate for crowdsourcing, and
the information indicating that the task is inappropriate for crowdsourcing being provided otherwise.

17. The method of claim 8, where at least one subtask, of the two or more subtasks, is further divided when a task completion probability of the at least one subtask, of the two or more subtasks, does not meet the threshold.

18. The method of claim 8, where the task information identifies at least one of:
- a budget associated with at least one of the plurality of tasks,
- one or more skills associated with performing at least one of the plurality of tasks,
- a description of at least one of the plurality of tasks,
- a duration of at least one of the plurality of tasks, or
- a task confidentiality level of at least one of the plurality of tasks; and where the worker information includes at least one of:
- information indicating that a worker is associated with a particular organization,
- information identifying particular skills associated with a worker,
- information indicating that a worker is associated with a worker confidentiality level,
- past worker performance information associated with a worker,
- a crowdsourcing platform associated with a worker, or
- a billing rate associated with a worker.

19. The method of claim 8, further comprising:
determining that a first worker and a second worker, of the plurality of workers, can be matched with a particular task,
- the first worker and the second worker being associated with a first worker ranking value and a second working ranking value, respectively,
  - the first worker ranking value being a different worker raking value than the second worker ranking value; and
matching the first worker with the particular task based on the first worker ranking value and the second worker ranking value.

20. The device of claim 1, where the task information identifies at least one of:
- a budget associated with at least one of the one or more tasks,
- one or more skills associated with performing at least one of the one or more tasks,
- a description of at least one of the one or more tasks,
- a duration of at least one of the one or more tasks, or
- a task confidentiality level of at least one of the one or more tasks.

* * * * *